United States Patent [19]

Hughes et al.

[11] Patent Number: 5,920,261
[45] Date of Patent: Jul. 6, 1999

[54] METHODS AND APPARATUS FOR TRACKING AND DISPLAYING OBJECTS

[75] Inventors: George V. Hughes, Toronto; Chris Ouslis, Willowdale, both of Canada

[73] Assignee: Design Vision Inc., Ontario, Canada

[21] Appl. No.: 08/775,682

[22] Filed: Dec. 31, 1996

[51] Int. Cl.⁶ .................................................. G08B 13/181
[52] U.S. Cl. .................. 340/572; 340/525; 340/539; 340/825.08; 340/825.35; 342/126; 342/146
[58] Field of Search .................. 340/572, 539, 340/524, 525, 825.08, 825.11, 825.55, 825.34, 825.35; 342/126, 146, 465

[56] References Cited

U.S. PATENT DOCUMENTS

| | | | |
|---|---|---|---|
| 4,215,345 | 7/1980 | MacDoran | 343/112 R |
| 4,656,463 | 4/1987 | Anders et al. | 340/572 |
| 4,814,742 | 3/1989 | Morita et al. | 340/825.35 |
| 5,648,765 | 7/1997 | Cresap et al. | 340/825.35 |
| 5,673,037 | 9/1997 | Cesar et al. | 340/825.35 |

*Primary Examiner*—Glen Swann
*Attorney, Agent, or Firm*—Bereakin & Parr

[57] ABSTRACT

In a system for planning, visualizing, tracking and analyzing physical objects such as merchandise in a retail space, a transponder is attached to each object and the transponders are interrogated periodically by a transmitter. Receivers receive the transponder signals and direct the received signals to a location processor which determines the location of each object. The locations of the objects can be displayed in various formats on a two or three dimensional map of the space. When objects are moved, they are interrogated more frequently so that traffic patterns in the space can be displayed.

53 Claims, 23 Drawing Sheets

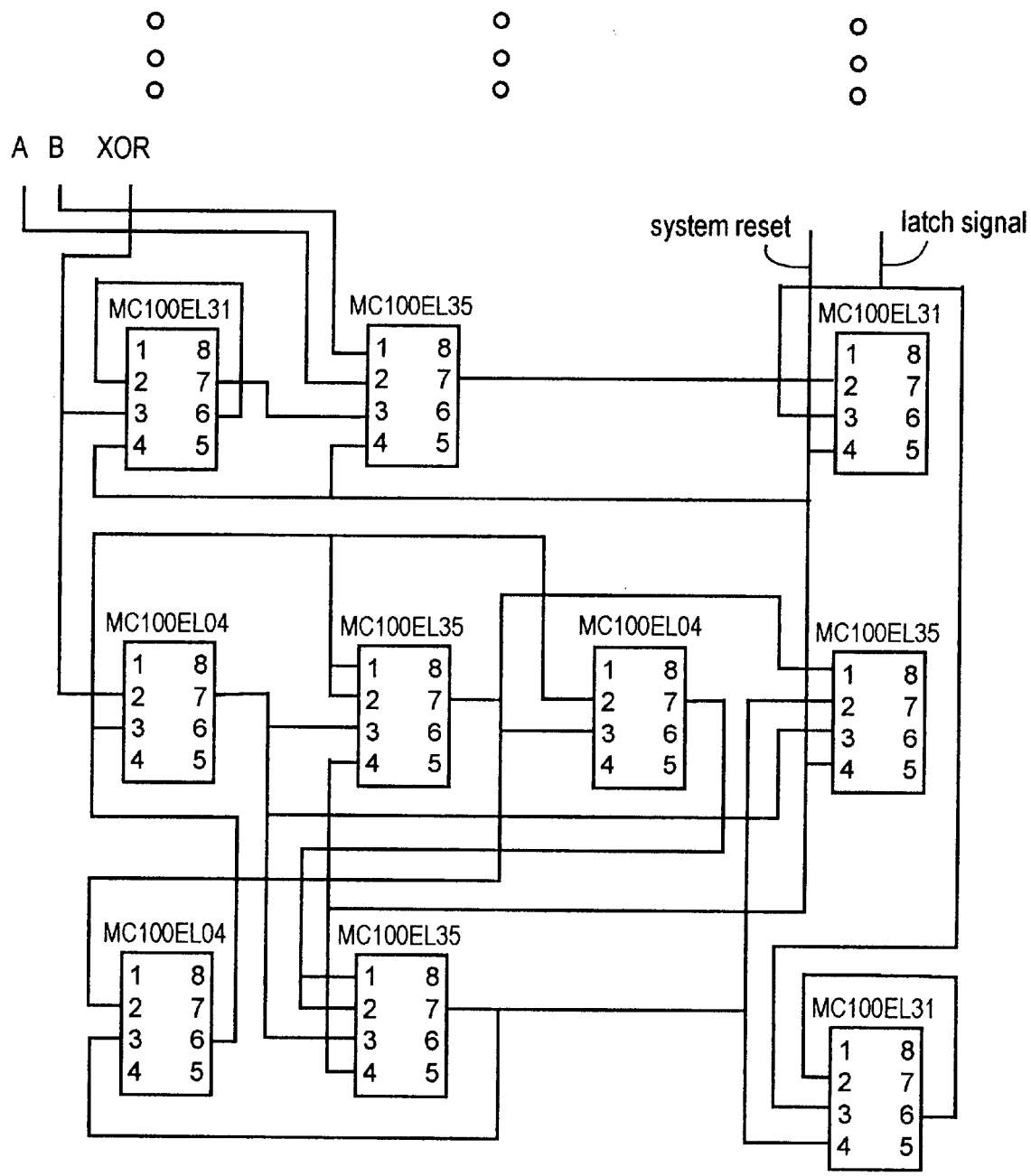
FIG. 14b(ii)

METHODS AND APPARATUS FOR TRACKING AND DISPLAYING OBJECTS

FIELD OF THE INVENTION

This invention relates to methods and apparatus for tracking, displaying and managing objects within a known area.

BACKGROUND OF THE INVENTION

Means for accurately tracking, displaying, and managing a large number of objects within a known area with high precision, with respect to both location and time, presently do not exist. A system providing such means would be highly beneficial in retail, warehousing, facility management, office document control, and other environments.

For instance, the retail sales industry has embraced many advances in technology enabling users to automatically assess inventory on hand, items placed on sales floors, and items sold. These advances have come primarily through bar code technology and point-of-sale computerization. It is also generally known to locate objects using triangulation methods. For instance in MacDoran, U.S. Pat. No. 4,215,345, a time difference of arrival (TDOA) technique to determine location is disclosed, involving the computation of the intersection of two or more hyperbolic surfaces.

However, there are currently no means to track the location of items for sale in a retail environment and to simultaneously display those positions in a modelled real-time retail environment. In addition, there currently exists no means of quantifying and analyzing the effects on sales of store layout, particularly the impact of rearranging fixtures to place items for sale at various different locations. Therefore, while it is generally known that the location of merchandise items and the layout of store fixtures impacts the buying habits of consumers, no data exists which tracks these characteristics, nor are there tools to use such data to assign value to location for optimizing space.

OBJECT OF THE INVENTION

An object of the present invention in one aspect is to offer users the means to monitor and maintain an accurate representation of the location of all inventory or merchandise of interest in a retail outlet, warehouse, office, or other area of interest. A further purpose of the present invention in another aspect is to observe the movement of articles within a known area. The precise location of object fixtures (such as furniture, shelves, and containers) can also be monitored, eliminating the need to update the physical layout of an area each time a change is made.

Another purpose of the present invention, in another aspect, is to offer users the means to utilize the information obtained to infer the economic value of location within the defined environment. A further purpose in yet another aspect is to give the user the means to employ the data to ascertain the economic/financial impact of changes of layout (where layout is defined as any aspect which the user can control in its environment, such as lighting, color, texture, etc.) to the defined environment.

SUMMARY OF THE INVENTION

In one of its aspects the present invention provides a method of monitoring objects contained in a selected space, each object having a transceiver thereon, each transceiver being capable of responding to an interrogation signal sent by a transmitter by sending a response containing an identification of the object associated with such transceiver, each transceiver having a unique address, said method comprising:

(a) operating said transmitter to interrogate said transceivers sequentially at selected intervals, (b) determining from said transceivers the locations of their associated objects, (c) entering said locations of said objects in a computer memory, (d) reading the contents of said memory and displaying the locations of said objects.

In another aspect the invention provides a method of monitoring objects in a selected space, each object having a transceiver thereon, each transceiver being capable of responding to an interrogation signal sent by a transmitter by sending a response containing an identification of the object associated with such transponder, said method comprising:

(a) operating said transmitter to interrogate said transceivers at selected intervals, (b) receiving responses from said object at at least two pairs of receivers, (c) determining the difference in arrival times of said response at each receiver of a pair of receivers by initiating the counting of a counter at a time synchronized with the arrival of said response at one receiver of each said pair and by stopping said counter at a time correlated with the arrival of said response at the other receiver of each said pair, (d) and determining from the differences in arrival times of said response at said respective receivers the location of said object.

In yet another aspect the invention provides a method of monitoring a set of objects in a selected space, each object having a transceiver thereon and each object having at least one attribute, each transceiver being capable of responding to an interrogation signal sent by a transmitter by sending a response containing an identification of the object associated with such transceiver, said method comprising:

(a) operating said transmitter to interrogate said transceivers at selected intervals, (b) determining from said transceivers the locations of their associated objects, (c) entering said locations of said objects in a computer memory, (d) associating in a computer memory, for each object, at least one said attribute of such object, (e) reading the contents of said memory or memories and displaying the locations of at least selected objects from said set of objects, and at least one attribute of each displayed object.

The invention also has a number of other aspects, all of which will become apparent from the following disclosure, taken together with the accompanying drawings.

BRIEF DESCRIPTION OF THE DRAWINGS

FIG. 14b shows a wiring diagram for a Motorola® ECLinPS implementation of the circuit of FIG. 14a.

DETAILED DESCRIPTION OF THE INVENTION

THE 3DPOS SYSTEM

Figure 1:
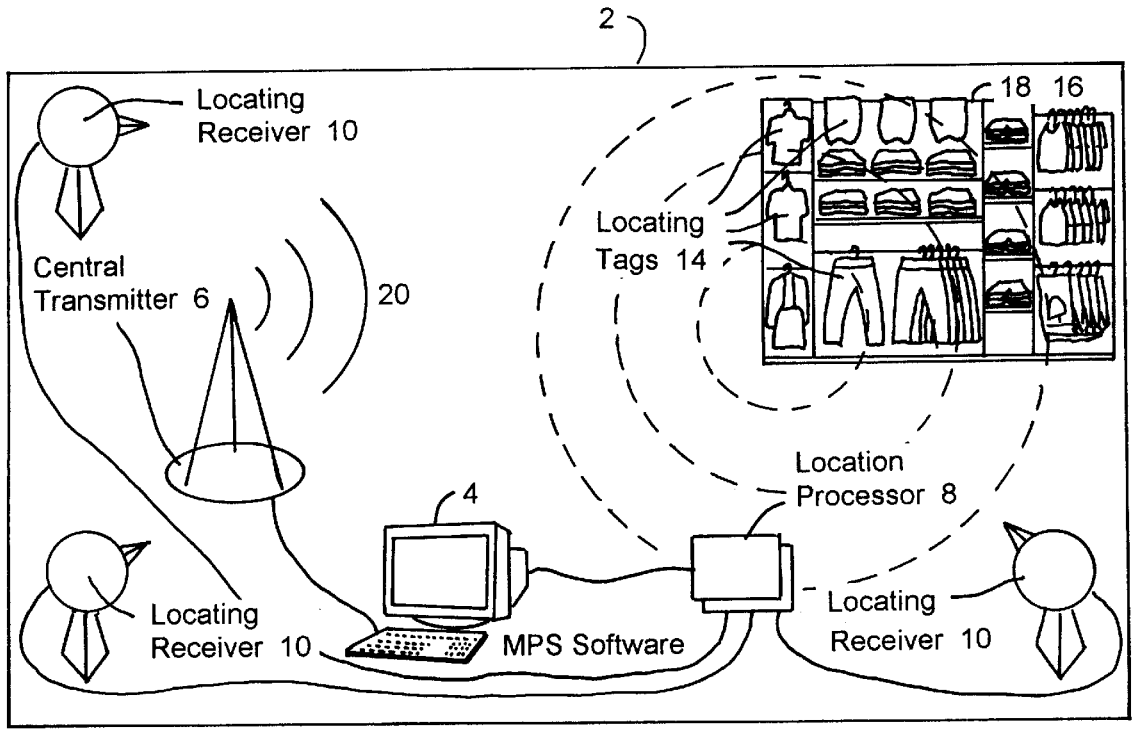
FIG. 1 is a block diagram of the 3DPOS (three dimensional position) system.

A block diagram of the 3DPOS (THREE-DIMENSIONAL POSITION) system 2 is shown in FIG. 1. The system is controlled by a central processor 4 connected to a central transmitter base station 6 and to a delay calculation processor 8. The central processor 4 may be a PC or micro-controller. The delay calculation processor 8 is, in turn, linked to at least three pairs of locating receivers 10 at fixed positions around the surveillance area 12. Locating tags or transponders or transceivers 14 are attached to each merchandise item 16 and each fixture item 18 on which merchandise is displayed. (In this description the terms "tag", "transponder" and "transceiver" will be used interchangeably.) In the preferred embodiment, radio frequency or RF signals 20 are used for communication between the central transmitter 6 and transponders 14 as well as between the transponders 14 and the locating receivers 10. The advantages and limitations of RF communication are well known to those skilled in the art.

Digital information is transmitted from the central transmitter 6 to the mobile tags or transponders 14. The selected modulation scheme is not important. Amplitude modulation can be employed, but various forms of phase, frequency or spread spectrum modulation techniques can also accomplish the task. In the preferred embodiment, amplitude modulation is used since it requires the simplest circuit realization for the tag transceiver which in turn results in greater power efficiency. In addition, the particular carrier frequency selected has little effect on the system's operation, although the frequency does have a direct effect on the length of the required antennae. For instance, a carrier frequency in the Industrial-Scientific-Medical or ISM band (2.3 to 2.45 GHz) can be used. The lower ISM band (902–928 MHz) may also be employed with a commensurate increase in antenna length.

Figure 2:
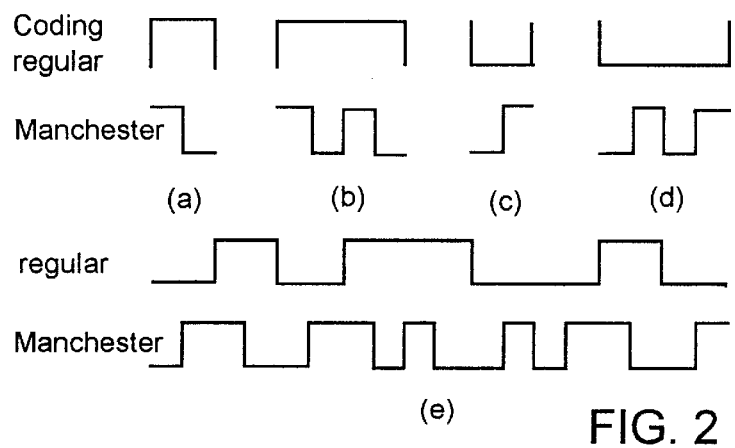
FIG. 2 illustrates the technique of Manchester phase encoding or slit phase encoding.

The clock signal or clock sequence at the central processor 4 must be recoverable at each transponder 14 since RF digital data is being communicated. This can pose a problem, for example, in a situation where a long sequence of ones or zeros, or highs or lows, is transmitted since there would be no transition throughout the sequence and no means of determining clocking information. This can be remedied by using a technique such as the well known Manchester phase encoding or split phase encoding technique, as shown in FIG. 2. A logic high is transformed into a signal which begins with a logic high and switches to a logic low half-way along the original signal's duration. For a logic low, the signal goes from a logic low to a logic high. Such an approach ensures that there is always a transition at the mid-point of the regular digital signal and allows the clock signal to be readily extracted from the transmission. The principal drawback of this approach, however, is that it results in a doubling of the communication bandwidth. Alternatively, if the signal is transmitted without any encoding (and thus with no increase in bandwidth), a high speed receiver clock (at a frequency many times the data clocking rate) can be used to capture the signal and then determine which phase to use to convert the information to the original data rate.

Figure 3:
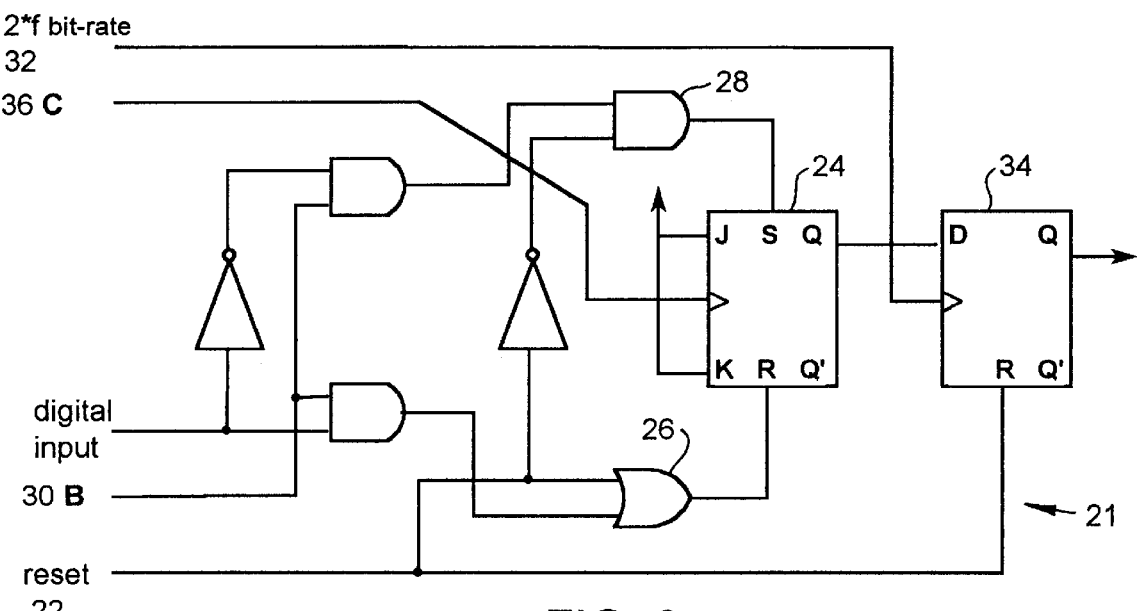
FIG. 3 is a Manchester phase encoder circuit.

The circuit to perform the Manchester encoding is shown at 21 in FIG. 3. Because this circuit is well understood by those familiar with digital circuitry, its operation is discussed only briefly here. A reset signal 22 is sent to put the circuit into a known state. This has the effect of resetting the JK flip-flop 24 through the OR gate 26, and ensuring that the reset input of the JK flip-flop 24 is kept low through the inverted reset signal and the final AND gate 28 before the JK flip-flop's set input. The reset signal 22 is returned to a logic low level for normal operation of the circuit, freeing the OR gate 26 to pass any signals on to the JK flip-flop's 24 reset input. The reset signal 22 is inverted to a logic high during normal operation before being passed to the final AND gate 28 before the JK flip-flop's set input. This serves to pass any set signals freely to the JK flip-flop.

Figure 4:
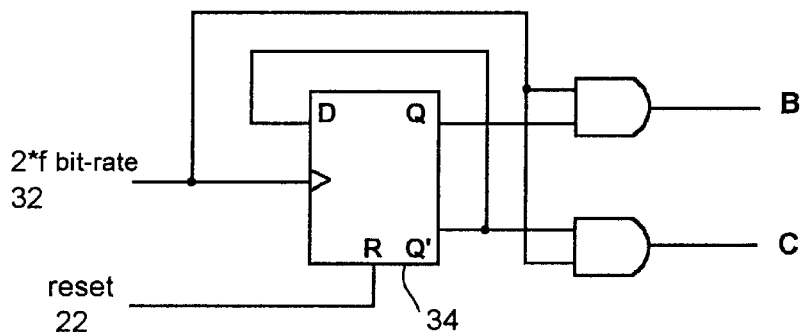
FIG. 4 shows the circuitry used to generate the timing of the Manchester encoder.
Figure 5:
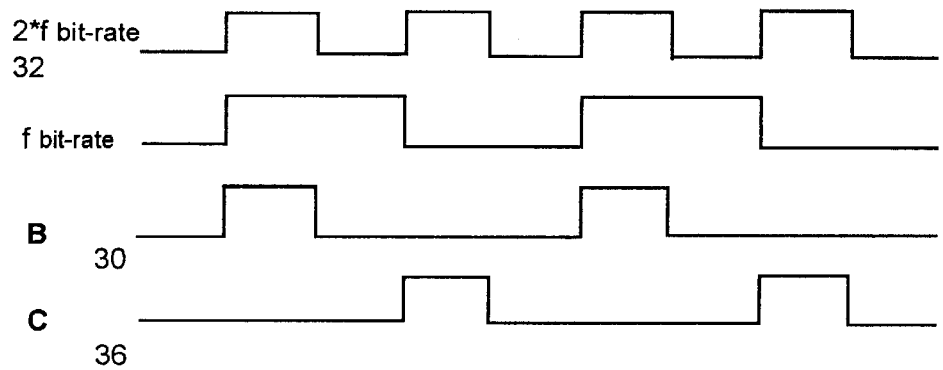
FIG. 5 shows the resulting timing signals from the circuit of FIG. 4.

The circuitry used to generate the timing of the Manchester encoding circuitry is shown in FIG. 4, and the resulting timing signals are shown in FIG. 5. The B signal 30 functions as a gate for the original digital input to synchronously set or reset the JK flip-flop 24 for an input of one or zero respectively. The B signal 30 then returns to a low logic state isolating both the set and reset inputs of the JK flip-flop 24 from any further change, but leaving the flip flop in its current state. The rising edge of the double bit-rate clock 32 now causes the D flip-flop 34 to load the output of the JK flip-flop 24, passing the first half of the encoded signal to the output. Simultaneous with this rising edge (or actually one propagation delay later) is the assertion of the C signal 36. The C signal 36 clocks the JK flip-flop 24, which is set in a toggle mode, causing the output of the flip-flop to yield the alternate binary signal (for example, a zero if the previous output was a one). The C signal 36 then returns to a zero level before the double bit-rate clock's 32 rising edge loads the D flip-flop 34 with the second half of the encoded signal from the JK flip-flop's 24 output. At this point the process repeats.

Figure 6:
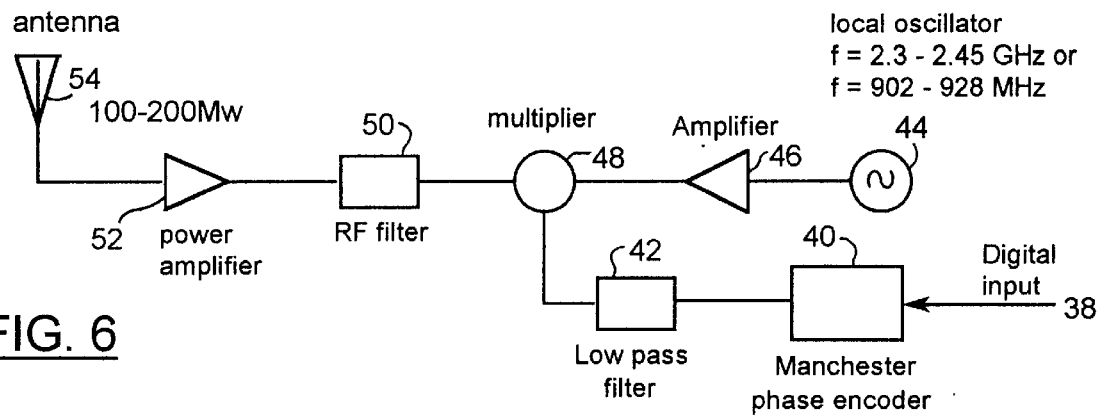
FIG. 6 is an example of an block diagram implementation of the RF transmitter.

FIG. 6 shows an example of an implementation of the RF transmitter appropriate for use with digital input that is to be amplitude modulated. It will be clear to a person skilled in the art that other possible designs are equally viable. The same transmitter design can also be used for communication from a transponder 14 to the locating receivers 10 to determine the location of the transmitting tag.

Referring to FIG. 6, the digital input signal 38 is supplied to the Manchester encoding circuit 40 (if used) at the desired digital frequency or bit-rate. The encoding process, as described above, serves to double the bit-rate. The signal is then passed through an analog low-pass filter 42. The filter eliminates the high frequency components of the digital signal which are not necessary in extracting the information at the receiver.

Referring still to FIG. 6, a local oscillator 44 directly generates the carrier signal which is passed through an amplifier 46. If amplitude modulation is employed, the purity of the carrier signal is not a significant factor in the performance and operation of either the transmitter or the receiver. The output from the 42 (which reduces intersymbol interference or ISI) is used to amplitude modulate the carrier signal at the modulator/multiplier 48. Following the modulator/multiplier, an analog band pass filter 50 is used to eliminate any signals outside the desired carrier range. The band will be centered about the carrier frequency with a bandwidth sufficient to transmit the digital information at the encoded bit-rate. The final stage of the transmitter is a power amplifier 52 which yields an appropriate output power (e.g. 100–200 mW) prior to the antenna 54.

All items in a particular area which are potentially of interest to the user are tagged with a transponder 14 and linked with a corresponding data element from a database. The 3DPOS system can be in operation for some given area or areas in each retail outlet, consisting of an entire floor, a department on a floor, or a storage or warehousing region, for instance. The presence of walls or barriers can adversely affect the operation of the system, particularly the ability to accurately determine the location of tags, because radio waves are severely attenuated and distorted by these obstructions. To avoid these difficulties, in one embodiment of the present invention, independent receiver array sets are used in each room or area of interest and each room or area is polled sequentially or independently.

A unique identification number allows the central processor 4 to uniquely identify each transponder 14 in the surveillance area. The central processor 4 associates whatever information the user desires with the unique identifier number or ID of the transponder. For example, not only can generic information for the item (such as the manufacturer, manufacturer's model number, wholesale cost, retail cost) be associated with the transponder ID, but so too can specific information such the color of the item and the date and time the item was placed into the desired area.

All items which a user intends to track are made active by the user. The act of entering the transponder ID number into the central processor serves to place the given transponder's ID number onto a list of active transponders which are contacted regularly to determine their position. Bar-code technology can be used to forward each transponder ID number to the central processor, and by printing the bar-code of the transponder's ID number onto each transponder, the entries can be easily added and deleted. The central processor 4 therefore maintains a record of which items have been activated and the location of those items, and it updates this information periodically. This ensures, for example, that only transponders which are of interest to a retailer to observe buying patterns or of interest to a property or warehouse manager to track the location of a particular type of item or items are polled regularly to determine their whereabouts.

Each item is contacted individually in order to determine its specific position. The central processor 4 sequentially polls each active transponder, determines its position, and then enters that information into the database. This procedure is repeated once the location of all items has been completed, and thus the positions of all items of interest is continuously updated. The locations of all items under observation can also be continuously transferred to a larger processor or computing system for the purpose of database updates, graphical display, or trend analysis. When an item is removed from the surveillance area 12 (e.g., because it was permanently removed or sold), its ID number is removed from the active list, and it will no longer be polled to determine its location. The central processor will be notified and the transponder's ID number can be determined through the use of bar-code technology at the time of removal. Thus while the tags are intended to be attached to items of interest while they remain within the surveillance area, once an item is permanently removed (for example, through purchase), its tag is removed so that it can be reused on a subsequent item of interest.

Figure 7:
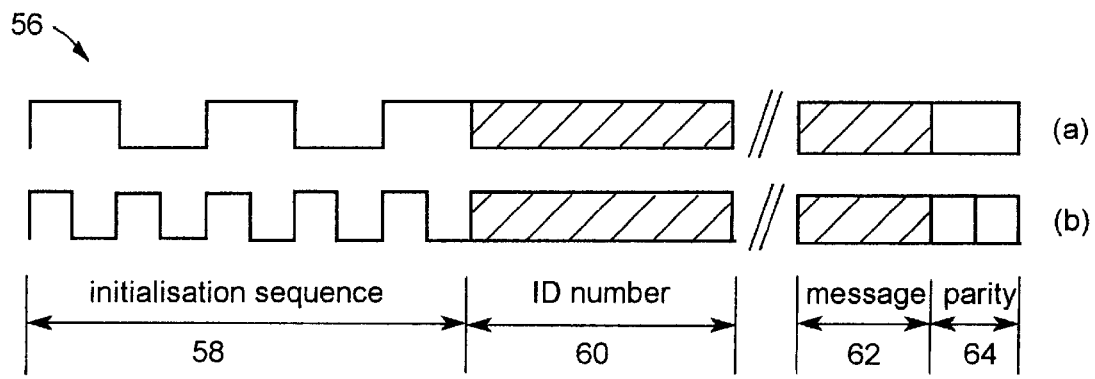
FIG. 7a illustrates the central transmitter signal format.
FIG. 7b illustrates the central transmitter signal format with Manchester encoding.

FIGS. 7(a) and 7(b) show an example of a typical format of a central transmitter signal 56. FIG. 7(b) illustrates the signal of FIG. 7(a) with Manchester encoding. In operation, the central transmitter 6 is sent an ID number 60 by the central processor 4 and generates a signal incorporating this number. The signal is coded such that the transponder corresponding to the ID number will recognize that it is being notified and will respond accordingly. The transmission may entail the encoding of additional information 62 supplied by the central processor along with the ID 60. This may take the form of a request for the transponder to supply additional information or to perform some alternate function. For example, the transponder can be prompted to indicate the current state of its battery when it responds, or to alter its transmission power level, or to transmit its reply at a particular frequency. Referring to FIG. 7, the central transmitter signal 56 may commence with an initial wake-up signal 58 to indicate that an ID number 60 will follow. This initialization or wake-up sequence consists of either an unmodulated signal at the selected frequency of communication with the transponders or a repetitive sequence modulated on to that selected frequency. As shown in FIGS. 7(*a*) and (*b*), the initialization sequence for the situation where Manchester phase encoding is used can be a series of binary ones, whereas when no clocking technique is used an alternating sequence of ores and zeros can be employed. The initialization sequence instructs the transponders to wake up as they preferably will have been in sleep mode to save power until this time. The transmission is terminated by an "end of message" sequence 64 which may include some form of error checking information, such as a parity check.

Figure 8:
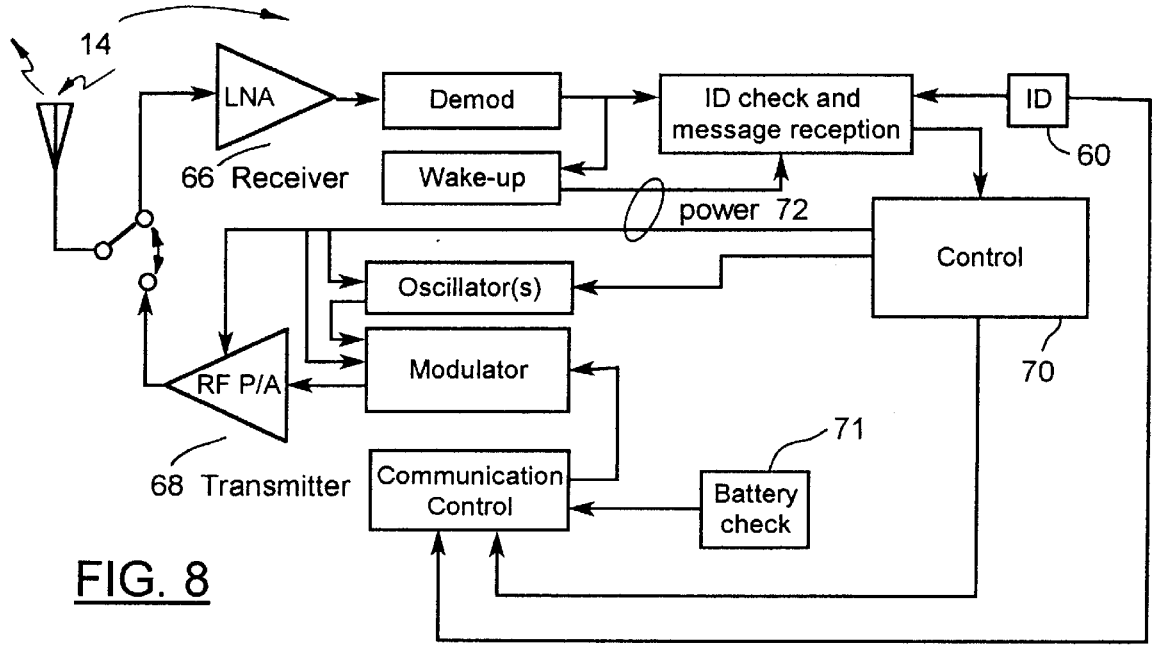
FIG. 8 is a block diagram of a transponder or locating tag.
Figure 9:
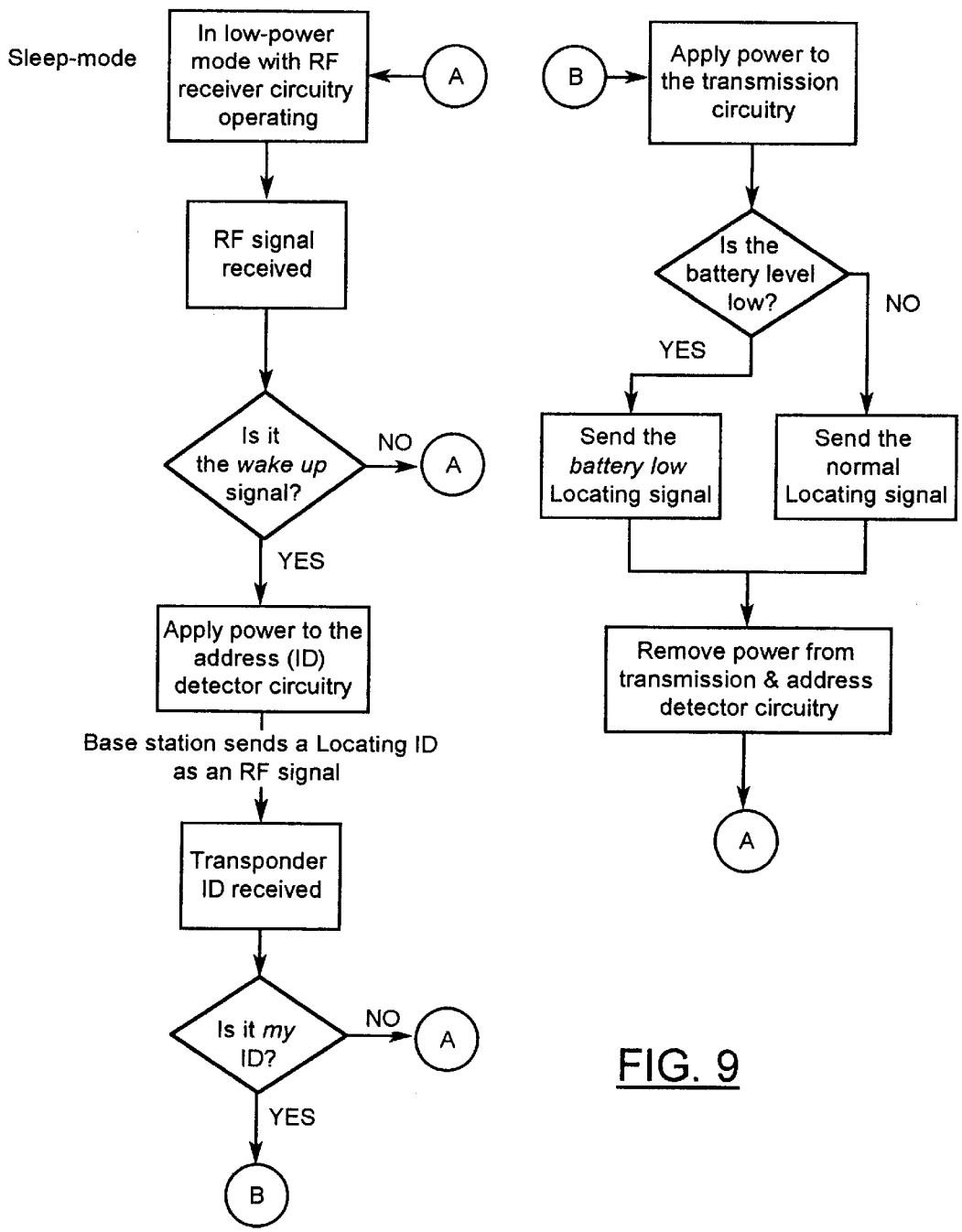
FIG. 9 is a flowchart of transponder operation.

Since the 3DPOS system determines the position of individual items, it requires each transponder 14 to be distinguishable. FIG. 8 shows a block diagram of the transponder which is physically attached to each item to be tracked. Each transponder 14 comprises a RF receiver 66, a RF transmitter 68, a unique identification or ID number 60, a local control unit including digital circuitry 70, a battery check circuit 71, and a power source 72. For retail sales merchandise, the mobile tag transponder 14 is sized within a package no larger than current anti-theft tags. In those cases, since the unit is of a limited size, it is beneficial to ensure that the power source or battery 72 exhibits a long lifetime through judicious use of power. The transponder thus remains in sleep mode, a low power state where most of the internal circuitry is shut down, in order to save power until it receives a wake-up signal. In facility management, storage, or warehousing environments, the size of the transponder is not crucial since it will be affixed to large items such as furniture or shipping containers. FIG. 9 provides a self-explanatory flowchart of the transponder (locating tag) operation.

Figure 10:
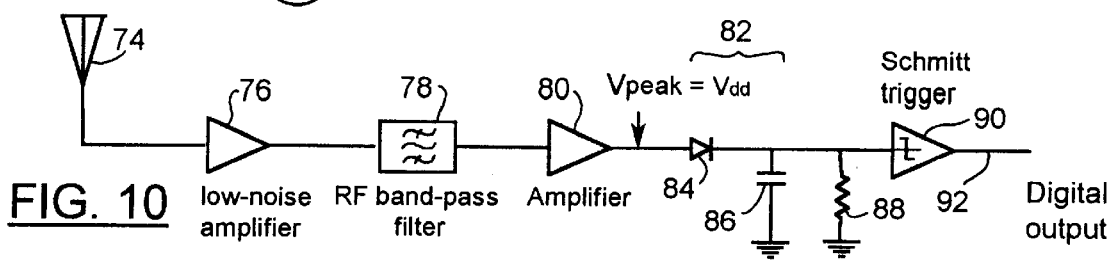
FIG. 10 is a block circuit diagram of a receiver.

FIG. 10 shows the circuit diagram of a transponder receiver 66. Such a receiver design can also be used for the locating receivers. The task of the receiver is to obtain and convert the modulated RF signal into a digital signal that can then be manipulated. The digital circuitry (not shown) which follows the receiver 66 extracts the clock signal and decodes the binary sequence into the original digital identifier or message that was sent. For receivers which are part of a mobile tag, the subsequent circuitry also determines if the incoming signal contains the correct wake-up sequence to apply power to the remainder of the mobile tag circuit (since most of the tag circuitry remains in sleep mode to save power until it is needed).

Referring to FIG. 10, the antenna 74 receives the signal and passes it on to a low noise amplifier 76 for the first stage of amplification. The analog band pass filter 78 can also precede the low noise amplifier 76. The filter 78 is centered about the transmitted carrier frequency as described for the transmitter. The filter 78 can be identical to the one used for the transmitter. The filter 78 is followed by another stage of amplification 80 (which may include an automatic gain control circuit) to bring the amplitude modulated signal up to a peak voltage of approximately the upper power supply limit of the amplifier 80. As will be familiar to those skilled in the art, the power supply voltage will typically be 3.3 V or 5 V depending on the components used. The second stage of amplification is needed to provide a signal of sufficient strength to ensure proper demodulation and to minimize losses by the demodulation circuit 82. The circuit 82 is a simple demodulator consisting of a diode 84 followed by a capacitor 86 and a resistor 88. The diode 84 serves to rectify the signal while the RC combination acts as a low pass filter to extract the low frequency, digital, modulating signal while eliminating the high frequency carrier component. The time constant of the RC combination is chosen to appropriately extract the digital signal by ensuring fast transitions for the demodulated signal and providing smooth rectification of the carrier. The final stage of the receiver 66 is a Schmitt trigger 90 which transforms the analog characteristics of the demodulated signal into a cleaner, sharper digital output signal 92 typical of binary information. The digital output 92 can then be passed on to a Phase-Locked-Loop (PLL) circuit (not shown) to recover the clock and to a Manchester decoder (also not shown) to extract the original digital signal. Alternatively, the digital output 92 can be passed to a signal recovery circuit employing a clock at some integer multiple of the original data rate and a means of selecting the appropriate phase to obtain the original digital signal.

In operation, the first action of a transponder which has received an ID signal is to determine whether the encoded ID number corresponds to that embedded in the transponder control unit (as shown in FIG. 9). If the ID number does not correspond, then no action is taken and the transponder goes back in to sleep mode until another transmission is detected. If the ID number matches, then the control unit 70 of the transponder has the transmitter 68 send a transmission so that its position can be determined. Following the transmission, the transponder returns to its battery saving sleep mode. As stated previously, the transponder transmitter 68 can be of the same or similar design to that shown in FIG. 6 for the central transmitter.

Figure 11:
FIG. 11 illustrates the transponder transmission signal format.

FIG. 11 illustrates an exemplary format for the transponder transmission signal 94. The signal comprises a pulsed signal burst 95 for a known, fixed duration which allows the receiver array and the delay calculation processor to obtain stable delay values. A pulsed signal also serves to conserve transponder power. Such a technique is only applicable in situations where a sufficiently significant amount of time is available to repeat the sequence of pulsed signal bursts. For applications where time is at a premium, the number of bursts is reduced, possibly to a single transmission. The loss of repetitive transmission sequences which can be used to average or select position calculations can be dealt with by providing alternate techniques such as the use of redundant locating receivers.

The reply sequence can be constructed in a similar (or identical manner) to the call sequence illustrated in FIG. 7, if the central transmitter and tag transmit on different frequencies. This avoids overlapping or confusing signals. Alternatively, the same frequency can be used if the two signals have distinct initialization sequences. For example, if the central transmitter begins with a sequence of binary ones, the tag can begin with a sequence of binary zeros preceded by a binary one (for proper timing acquisition). A further alternative is available when employing spread spectrum techniques, in which differing pseudo-random chipping sequences can be used to distinguish the signals intended for tags and locating receivers.

Although in operation, only a single, known, transponder responds at any given time, the transponder reply signal is constructed with the identification number of the replying tag encoded into the signal. Therefore, if this situation is violated because of an incorrect reply or because there are multiple replies, this is detected. The signal includes a message field which indicates, for instance, whether the transponder's battery level is low.

If additional information or some alternate action has been requested in the original transmission from the base transmitter, then either a response is encoded in the returned transmission from the transponder, or the action is performed as requested. For example, the transponder may be capable of transmitting its reply on a number of different frequencies, and the desired frequency will be stipulated in the information sent by the central processor in the original transmission. The ability of transponders (and the base transmitter) to transmit at various frequencies can be employed to avoid interference with neighbouring systems, or to multiplex the transponders' responses within a given system in order to monitor a large number of individual transponders. Alternatively, another method of avoiding interference between neighbouring systems can be used which employs the inherent independence of spread spectrum transmissions by using various pseudo-random control sequences.

Typically a transponder transmits only in reply to the central transmitter's message. However, a transponder may also transmit "out of sequence" to send the central processor a message, using a separate message channel with a frequency different from that used to determine position. For example, a transponder may transmit a final message that its battery is unable to provide sufficient power for any further transmission.

In one embodiment of the present invention, active transponders are effectively categorised into one of three lists, a stationary or still list for stationary transponders, a mobile or dynamic list for transponders in motion (mobile transponders), and a restricted list for transponders located within a defined restricted area (restricted transponders). Transponders typically begin on the stationary list where each transponder entry is contacted infrequently in order to determine that the transponder's location has not changed. When a transponder's location is determined to have changed by a selected distance (say more than 1 meter), the entry will be placed on the mobile list. Transponders on the mobile list are polled, to determine their location, more frequently than those on the stationary list, so that the motion can be followed more accurately. One limit in this method is that in noting when an item should be moved from the stationary list to the mobile list, a delay of up to the duration between successive updates for a given transponder on the stationary list may pass before it is recognised as being in motion. For example, if items on the stationary list are contacted at least every 5 minutes, a transponder may be contacted and its location noted to be the same as its previous position just before a consumer picks up the item in a store; the consumer may then walk for 6 minutes until the item's transponder is contacted again and, because of its new location, is placed on the mobile list. Transponders on the mobile list may be contacted at least every minute. An item would be placed on the stationary list from the mobile list if its location ceased to change, or if two subsequent pollings yielded positions within 1 meter. The items on the restricted list are contacted most often, for example every 5 seconds, and contain transponders whose locations fall within some bounds defined as a restricted area. A restricted area may be defined near an exit at a retail store or warehouse so that personnel can be notified for instances where tagged objects may be improperly removed. When the transponder returns to a non-restricted area, its ID will be returned to the mobile list. One advantage of this aspect is that immobile transponders are contacted less often, thus helping to save transponder battery power and freeing up time for the system to be able to monitor more transponders within a reasonable amount of time.

At least three pairs of locating receivers 10, each receiver having an associated antenna, compose the receiving array. The locating receivers employ standard RF technology and their design can be the same or similar to that shown in FIG. 10 for a transponder receiver. The receivers are positioned at the perimeter of the area to be observed, creating a surveillance area or region 12. Each locating receiver will pick up the signal transmitted from a given transponder, demodulate it, and process the signal so that it can be used in the delay calculation processor 8.

Figure 12A:
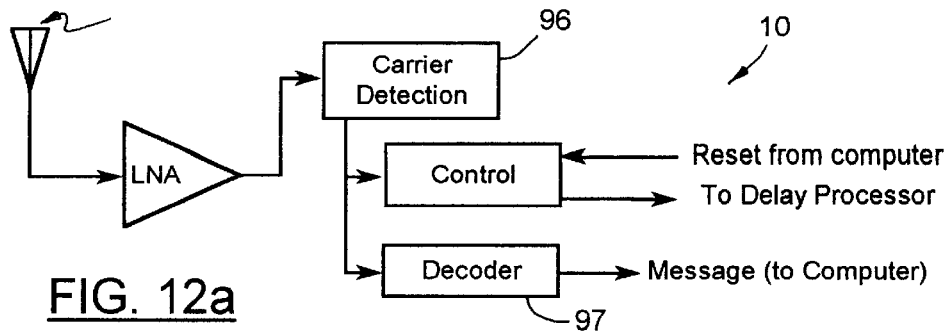
FIG. 12a is a block diagram of the receiver which decodes tag transmissions.

One specific receiver is used to decode the ID and message sent by the tag. A block diagram of the receiver is shown in FIG. 12(a). The remaining receivers may decode the transmitted ID and message and may be identical in structure, or may not have the decoding circuitry to process the encoded information. In operation, the output from the carrier detection circuit 96 is sent to the delay processor to indicate the arrival of the signal for the timing delay measurement. This is the only function most of the receivers perform. The receiver which performs the decoding function at 97 determines what ID was sent and what message was returned and sends this information to the central processor.

If two pairs of locating receivers are used, only a 2D location can be inferred, and the third coordinate could generally be assumed to equal some arbitrary height, such as ground level. Where three pairs of receivers are employed and placed at appropriate locations, a 3D position can be obtained.

Figure 12B:
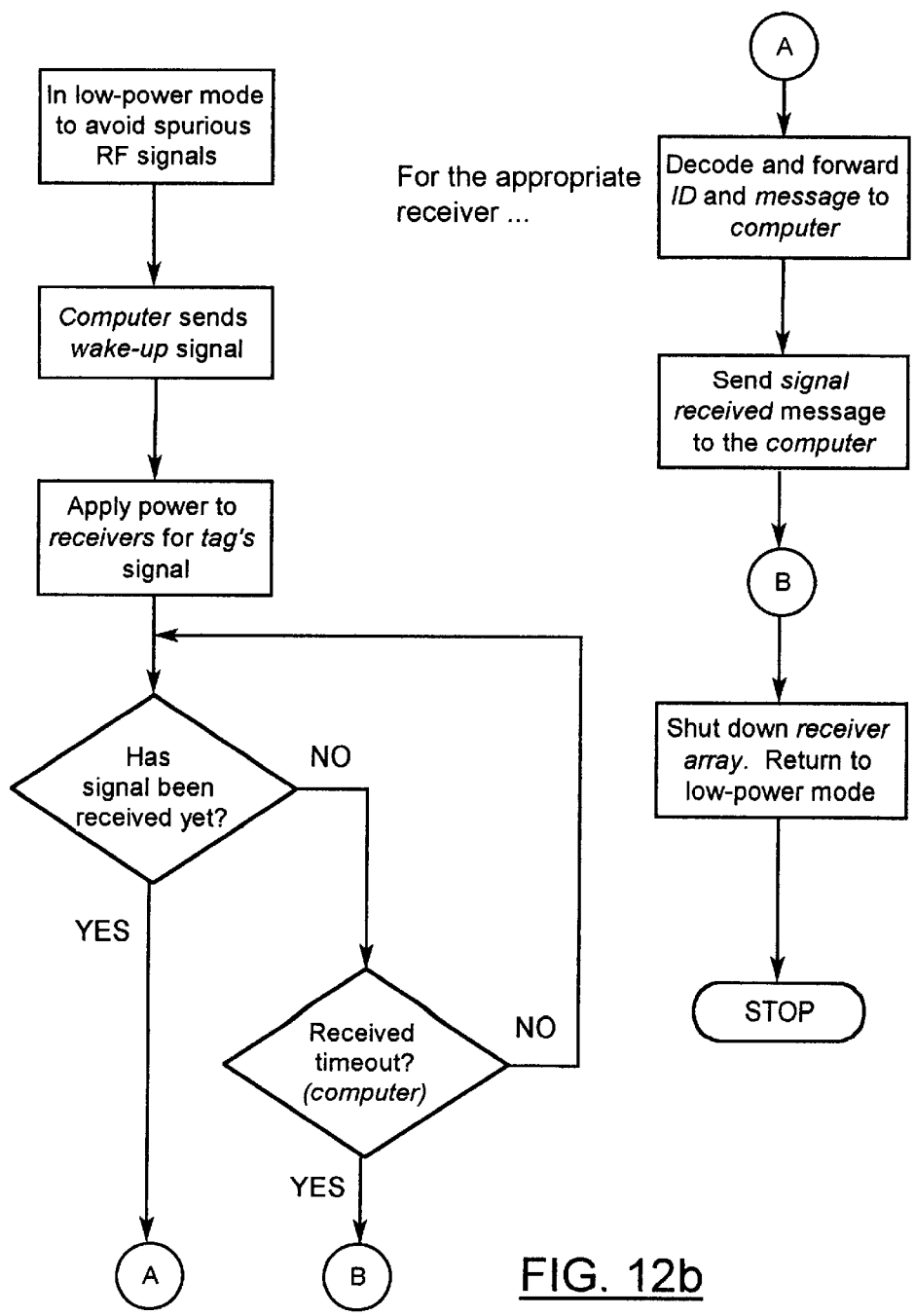
FIG. 12b is a flowchart of the locating receiver operation.
Figure 13:
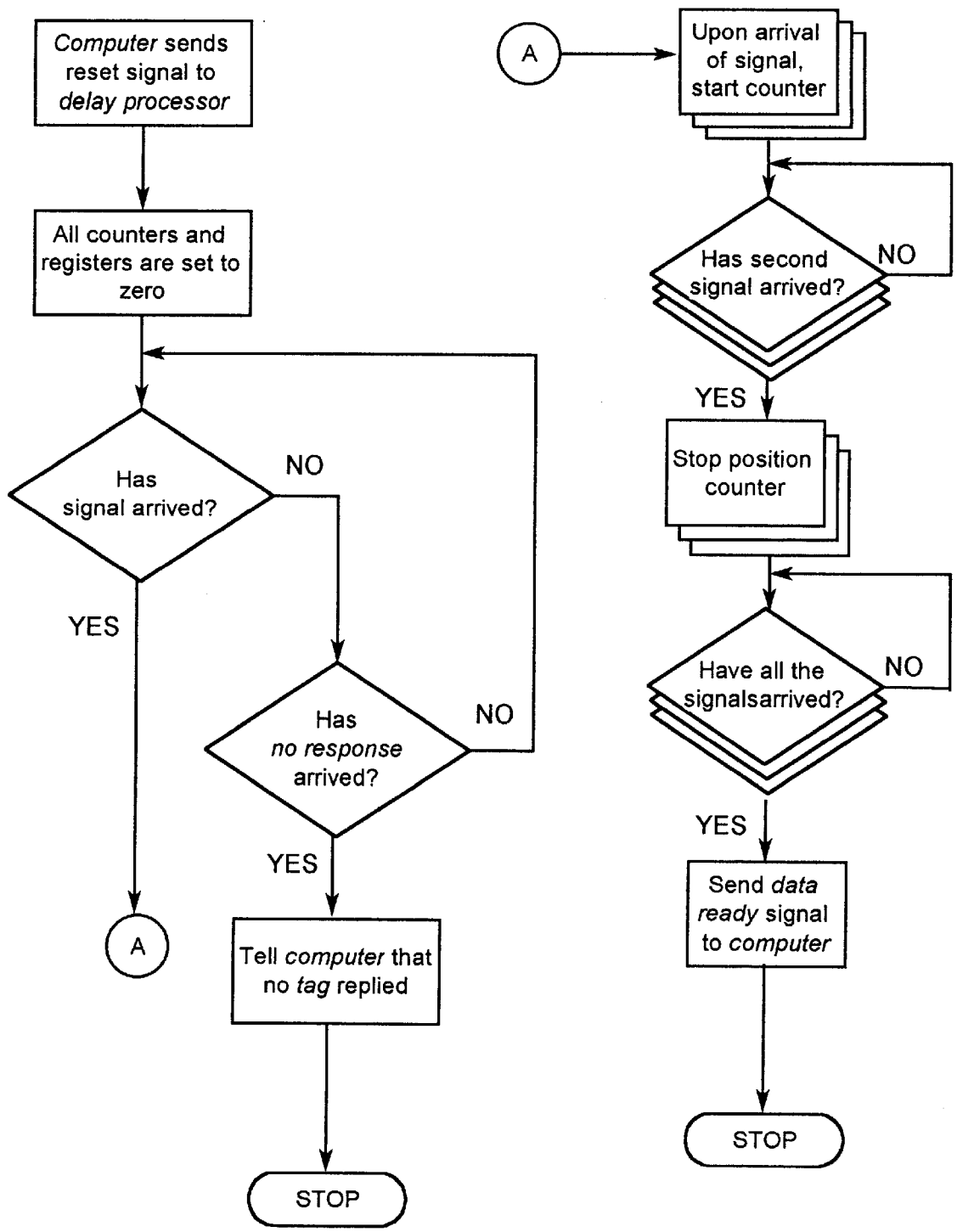
FIG. 13 is a flowchart of the delay calculation processor operation.

The delay calculation or location processor 8 collects signals from each receiver of the array and associates them pair wise. Where the signal is a sequence of repetitive pulse transmissions, the delay calculation processor can determine the delays for each pulse transmission and pass all the redundant information to the central processor. The multiple delay results for a single transponder can be averaged together to yield a final result or used in conjunction with other redundant information to obtain a more accurate result to minimize interference and multi-path radiation effects. Additional receivers can also be used to provide further redundant information for these purposes. If no signal was received during a fixed period of time (i.e. on completion of an error timer), it is assumed that the transponder was experiencing some sort of difficulty, as a response is expected. The system can then generate a warning to alert the user to some potential difficulty, along with the last known location of the item. This might occur upon sudden catastrophic battery failure, failure to replace a battery known to be approaching its lifetime, or a temporary metal obstruction blocking transmission. FIG. 12(b) shows a self-explanatory flowchart of the locating receiver operation, and FIG. 13 shows a self-explanatory flowchart of the delay calculation processor operation.

As is known, the radio signal emitted by a single transponder yields a relative time delay upon its reception at two physically separate receivers. The delay defines a 3D hyperboloid of possible transponder locations. The delay between a second pair of appropriately placed receivers defines a second 3D hyperboloid. The two hyperboloids intersect resulting in two lines of intersection upon which the transponder may be located. To establish a 2D position, an assumption is made for the location of the transponder along the lines to eliminate uncertainty by removing a degree of freedom in the transponder location. To accurately determine the 3D location, a third pair of appropriately placed receivers provides a third 3D hyperboloid, whose intersection with the two lines of intersection results in two distinct points where the transponder may be located. One of these points lies within the surveillance region and indicates the correct position of the transponder, while the other point lies outside that region.

All connections from the receivers to the delay calculation processor are made as close to identical as possible so as not to introduce position offset due to errors. In effect, all cable lengths from the receivers to the delay calculation processor must be of equal length, regardless of the actual distance between the two units. In addition, each receiver should be similarly constructed to introduce equal signal processing effects. Alternatively, differences in wire lengths, or other characteristics, can be compensated for in software. A precise transmission from a known location is used to initialize the system and establish the correction factors for the software.

The actual determination of the delay time in the arrival of the two signals from a pair of physically distinct receivers is determined by counting the clock cycles of a very high frequency clock source during the period between the arrival of the leading (or trailing) edge of the first signal and the arrival of the leading (or trailing) edge of the second signal. The resolution of the position determination is a function of the frequency of the clock. Increasing the clock speed allows the resolution of smaller differences in time which, in turn, yield smaller differences of distance as the precision of the positioning information. Thus, the availability of high speed circuitry can provide for more precise positioning information.

When the central computer relays an ID number to the central transmitter, the computer also instructs the delay calculation processor to reset its values and prepare itself to receive a new transmission from the responding transponder. This notification is necessary since the receiver array and the delay calculation processor are not actively "listening" at all times. The receiver array does not confuse the initial transmission, which notifies the transponder, with the transponder's reply.

Figure 14A:
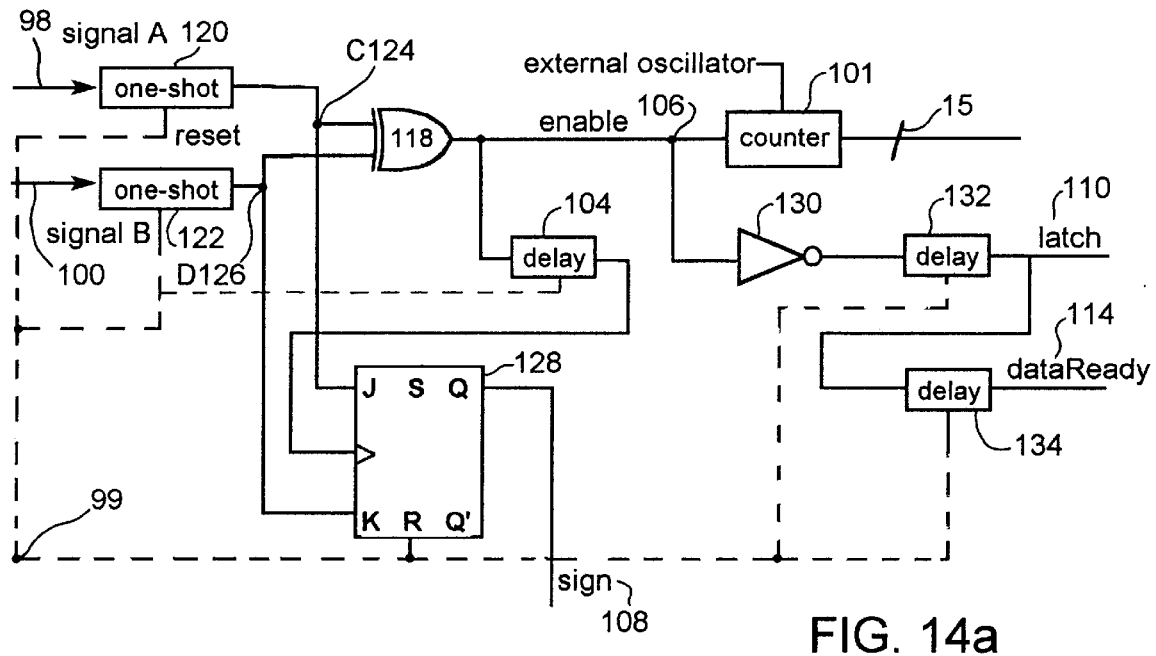
FIG. 14a shows a detailed block diagram of the delay calculation processor.

The operation and timing of the delay calculation processor are now described in detail. FIG. 14(a) shows a block diagram of the delay calculation processor 8. A reset signal 99 is applied to all blocks. Based on an external clock (not shown), the relative difference in arrival time of signals A 98 and B 100 from two physically distinct receivers is determined as a count of the clock periods between the arrival of the first leading (or trailing) edge. As indicated, the accuracy of the time delay between the two signals is set by the rate of the external clock used to control a counter 101. For example, a clock operating at 3 GHz allows for a resolution accuracy of approximately 10 centimeters. If the maximum operating range is 1 kilometer, then a 15 bit counter is sufficient to reflect any integer count value (higher clocking frequencies will require larger counters for the same operating range). Because the precision is determined by a central delay processor and is independent of transceiver construction, RF frequency or modulation scheme, the transceivers can be designed to be smaller and to conserve battery power. The delay processor can then be supplied with the necessary power as it is located as part of a single central system, which reduces cost. If the 10 centimeter accuracy noted above is not adequate, better accuracy can be obtained by operating the clock at a higher rate, e.g. 30 GHz, which will allow for example a one centimeter accuracy.

If desired, two or more transceivers may be placed on an object, e.g. at opposite ends of the object, so that the orientation of the object can be determined. This is accomplished by interrogating first one transceiver and then the other on the object, and comparing their locations. This is particularly useful for warehouses or other locations where certain items in storage must not be stored upside-down, or on end, in which case the exact orientation can be monitored using for example three transceivers on one item. The precise orientation can be used to display the object in question graphically on the computer screen within the three dimensional environment. Alternatively or in addition, on recognition of incorrect orientation (for example a storage container which is upside-down), an alarm can be initiated in a simple manner as will be evident to those skilled in the art.

Figure 14B:
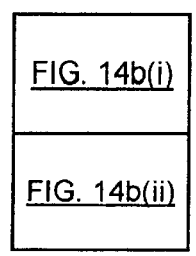
Figure 14B:
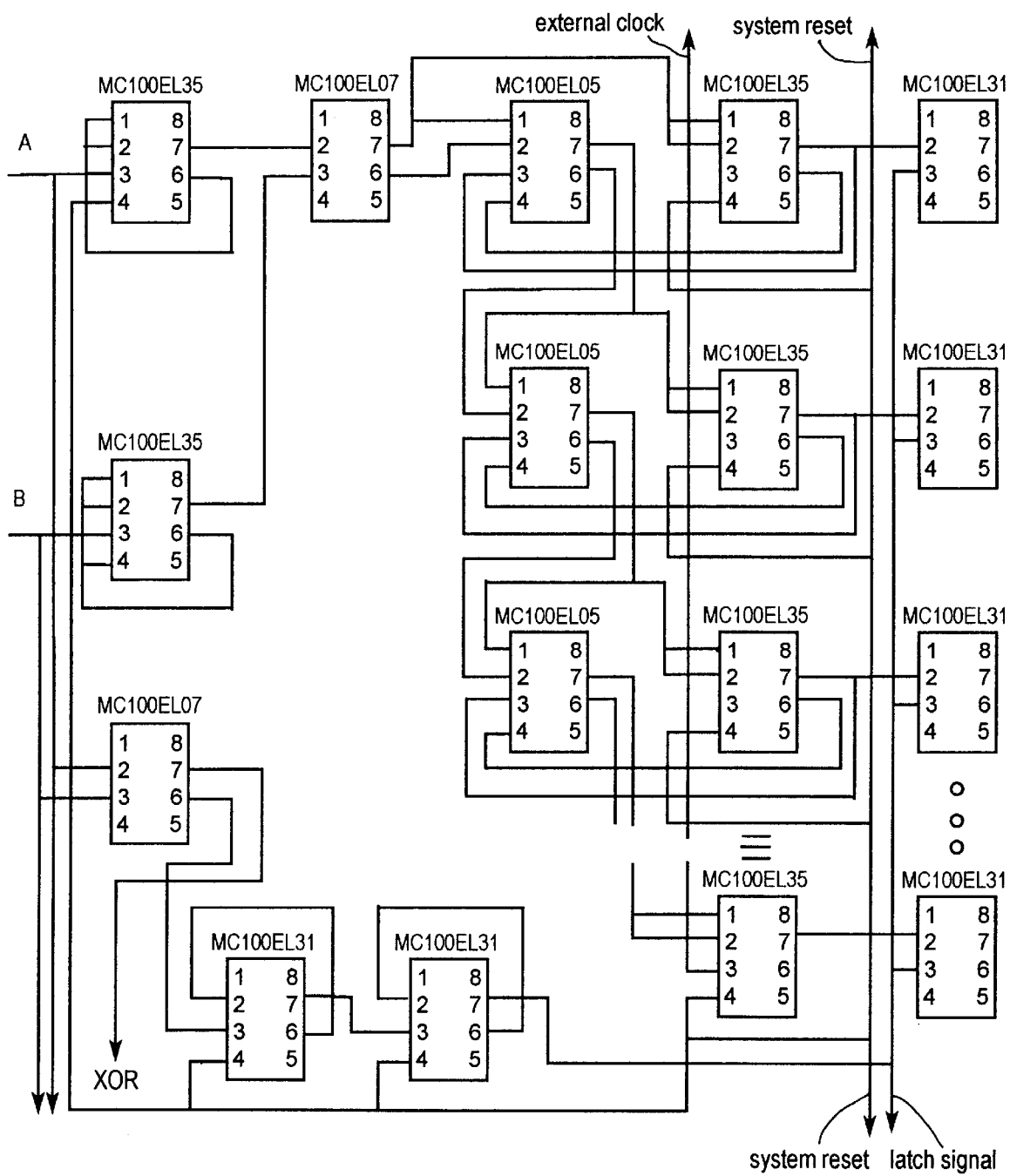

The circuit of FIG. 14(a) may be implemented using high speed discrete realizations for digital logic, for example those provided by the Motorola® ECLinPS family of components. FIG. 14(b) shows a wiring diagram for a Motorola® ECLinPS implementation of the circuit of FIG. 14(a) with the addition of an external clock source. The "Lite" series of this family allows operation in excess of 2 GHz, providing for precise position information.

Figure 15:
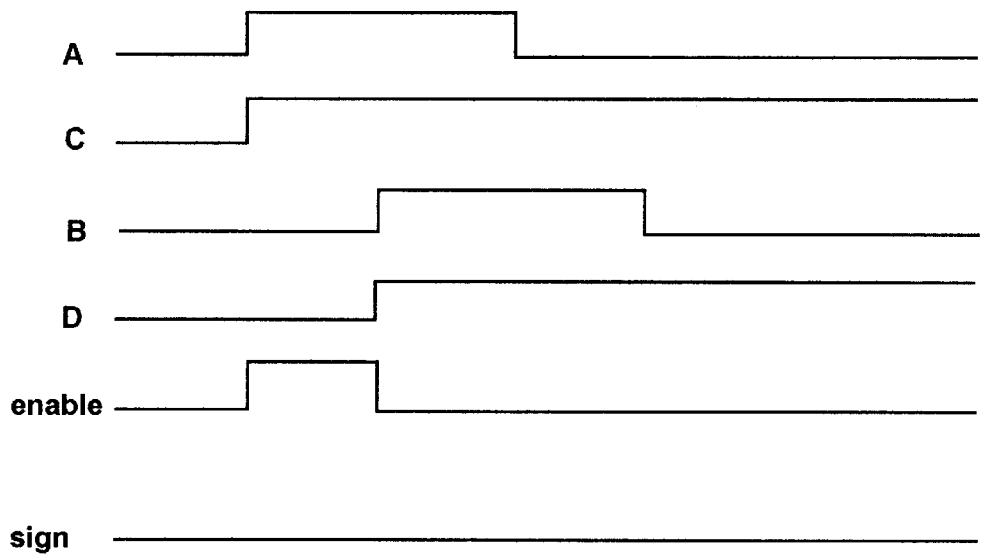
FIG. 15 shows an example of the timing for the delay calculation processor.

In determining the difference of arrival times of the two signals, an enable signal 106 is generated to start and stop the counter. In addition, a sign bit 108 is generated to establish which signal arrived first. The sign bit is established relative to one of the two signals. For example, if the A signal arrives first, the sign bit remains low, whereas if the B signal arrives first, the sign bit will be set to a logic high. An example of signal operation when the A signal precedes the B signal is shown in FIG. 15.

To hold the counter result, a latch signal 110 is necessary to load the counter value and the sign bit 108 into a data latch (not shown). This information remains in the data latch until the central processor can read and transfer it. A data ready signal 114 is generated to indicate when the latch has a valid copy of the counter value, so that the information from the data latch can be read and the value transferred to the central processor. The calculation of the actual relative delay (in seconds) between the two signals is determined by multiplying the period of the external clock by the integer counter value.

Referring again to FIG. 14(a), the operation of the circuit begins by the central processor placing all the flip-flops into a known zero state by raising the reset signal 99. This brings all signals throughout the circuit to their proper initial values. The arrival of one of the A 98 or B 100 signals controls the enable signal 106 via the XOR logic gate 118 and the one-shot circuit blocks 120 and 122 that each signal passes through. The one-shot circuit blocks 120 and 122 begin in a logic-low state until they receive the leading edge of their respective input signal. The leading edge causes each one-shot output, signals C 124 and D 126 to rise to a logic-one level and remain there until reset. This is illustrated in the timing diagram of FIG. 15.

Referring back to FIG. 14(a), the outputs from the one-shot circuits are fed through XOR gate 118 resulting in a logic one output from the time one signal arrives, and its one-shot output goes high, until the next signal arrives, whereupon its one-shot output goes high and causes the XOR output to return to a logic-zero level and remain there (since both one-shot outputs remain high). The output from the XOR gate 118 is the enable signal 106, and it controls the duration of time that the counter 101 actively monitors the high-speed, external-clock signal. The counter 101 output or value is the number of clock pulses that transpired for the duration of the enable signal. The maximum error of the delay value is one period of the external clock.

The order of arrival of the A and B signals dictates what form the sign bit will take. The leading edge of the enable signal, which is generated by the first signal change, is used to trigger a JK flip-flop 128. The J input of JK flip-flop 128 is the one-shot output C 124 and the K input is the one-shot output D 126. The Q output of JK flip-flop 128 is the sign signal 108. To ensure that the one-shot outputs 124 and 126 are present for a sufficient set-up time when the enable signal 106 arrives to trigger the JK flip-flop 128, the enable signal 106 passes through a delay circuit 104 first. The delay circuit 104 can consist of one or more D flip-flops in cascade connection, the total delay through which is sufficient to exceed the necessary set-up time for the JK flip flop 128.

The enable signal 106 is also inverted (at 130) and then passed through another delay circuit 132, to yield the latch signal 110 for loading the resulting timing information. The latch signal is passed through a subsequent delay circuit 134 to yield the dataready signal 114. As with delay circuit 104, the delay circuits 132 and 134 may consist of one or more D flip-flops connected in cascade.

The central processor 4 (FIG. 1) performs the mathematical calculations necessary to determine the precise positioning of transponders from the information supplied by the delay calculation processor 8. This information consists of values representing the timed delays between the arrivals of the transponder signal at the various locating receivers 10. The central processor uses these values to supply a standard triangulation algorithm with the necessary information to yield the resulting position. To assist in determining the position, the algorithm is provided with the precise location of each of the locating receivers comprising the receiver pairs and the speed of light.

The algorithm software interfaces with other software aspects of the system which control the maintenance of the POS database (storing the tag's position, its identification number, and a bar-code number used to support automated addition and deletion of the tags into the systems), the sequential polling of all active tags, and the exchange of information with retail, merchandise, warehouse, or facility management modules.

As already stated, each pair of receivers will define a 3D hyperboloid where the transmitter could be located. The receivers are the foci of the hyperboloid, and the eccentricity is controlled by the time delay of the signal's arrival at the receivers. Three independent pairs of receivers are sufficient to locate the transmitter in three dimensional space if the intersection of the three hyperboloids can be computed. The delay results yield a non-linear system of equations for which no trivial solution exists. In addition, measurement error may cause the three hyperboloids to not intersect precisely. As a result, a practical iterative approximation can be used. The difficult aspect in an approximation method is the task of determining an appropriate correction for each iteration. Corrections of greater complexity tend to be more accurate, but require significant amounts of computational time, while simple approaches are quick but also prone to error.

Figure 16:
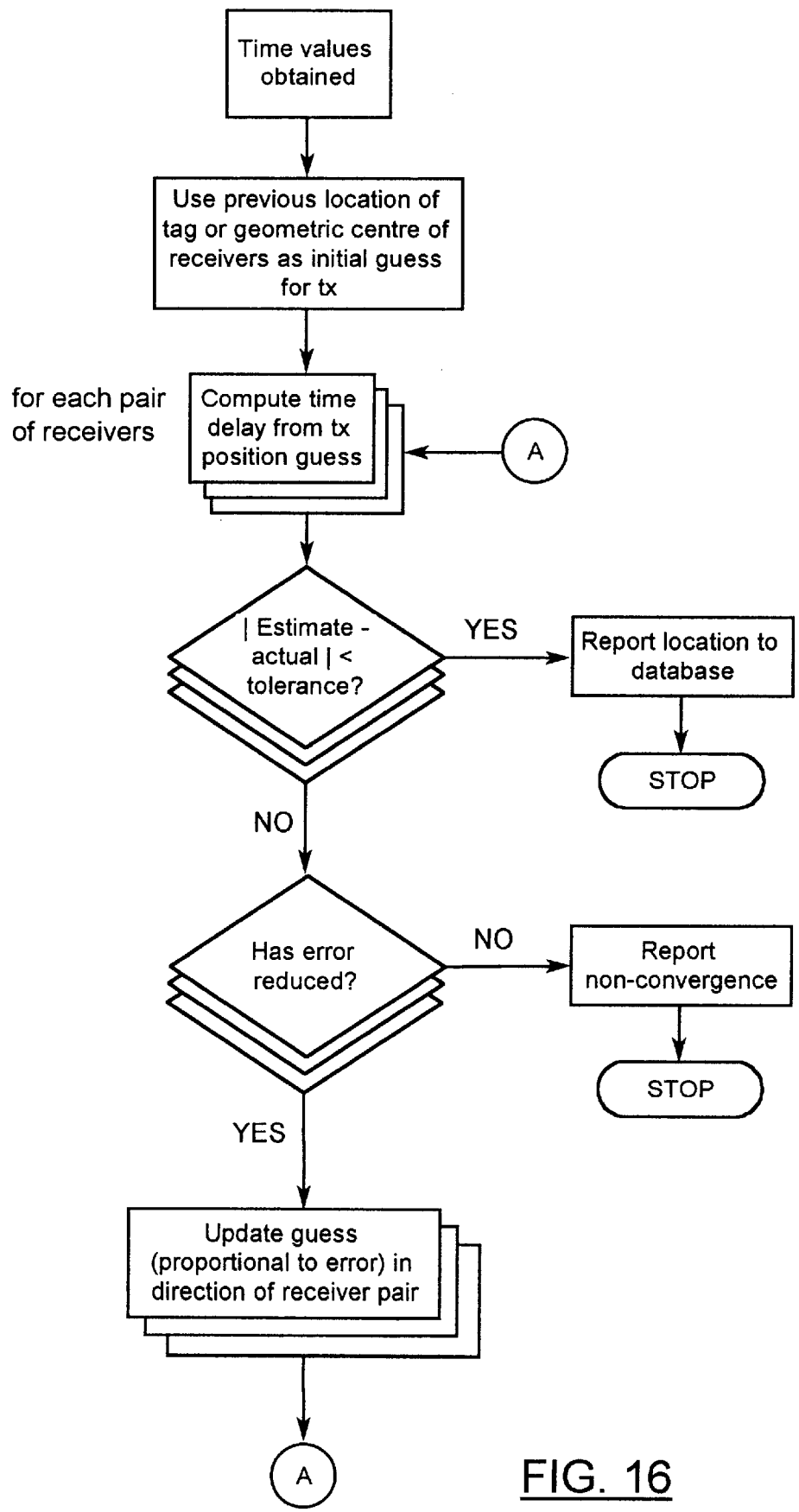
FIG. 16 is a flowchart of the iterative triangulation algorithm.

FIG. 16 shows a flowchart for the iterative triangulation algorithm. The delay values are loaded from the delay calculation processor. There is one delay value for each pair of receivers.

As shown, an initial guess is made for the location of the transponder. For example, the previous location of the given tag can be used if it is available and, if not, the geometric center of all of the known receiver locations can be used. For each pair of receivers, the time delay that would result using the current guess of the transmitter's position is calculated. The difference between the time-delay calculated from the estimated position of the transmitter and that obtained by measurement is then determined. If the difference is less than a predetermined tolerance, the estimate is sufficiently accurate. If the difference remains greater than the desired tolerance, then, if the error has improved over the previous iteration, the size of the error is used to establish what degree of correction to apply to the estimate. The estimate of the transmitter's position is altered in the direction parallel to the line joining the pair of receivers from which the time-delay value was obtained. If the error has increased over the previous iteration, the position for the transmitter cannot be determined and the position location algorithm is stopped. Alternatively, if the error increases, the algorithm can return to the calculation of the previous iteration and use a different updating technique in an attempt to reduce the error and avoid quitting the algorithm. These steps are repeated until the values from all pairs of receivers have been updated. When this has been accomplished the next iteration begins, and the process continues until the estimated position error is within the tolerance for each receiver pair. When the estimated location is deemed accurate, the final location calculated is passed to the database, and the position location algorithm is complete.

Figure 17:
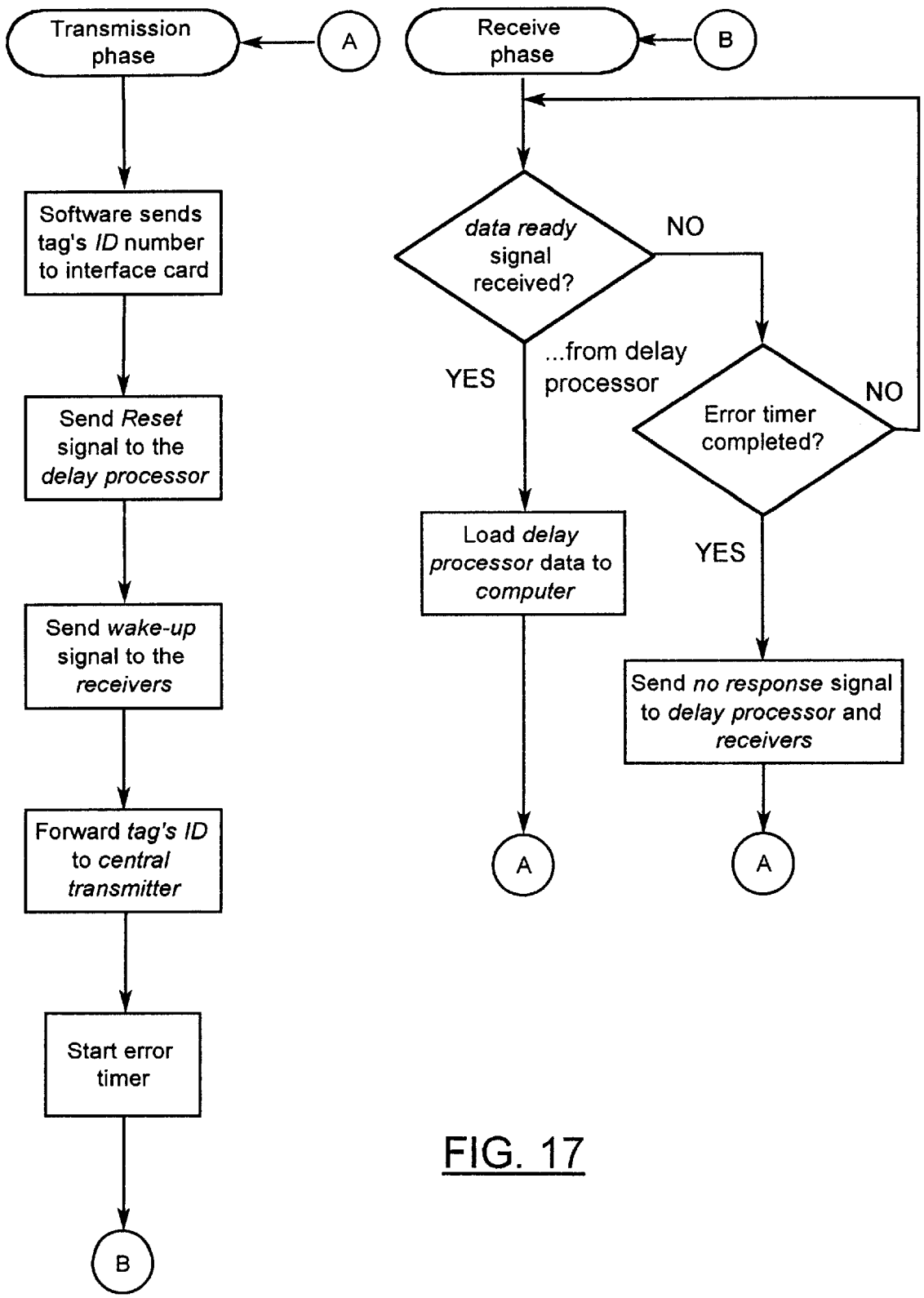
FIG. 17 is a flowchart of the input/output signal operation of the central processor.
Figure 18:
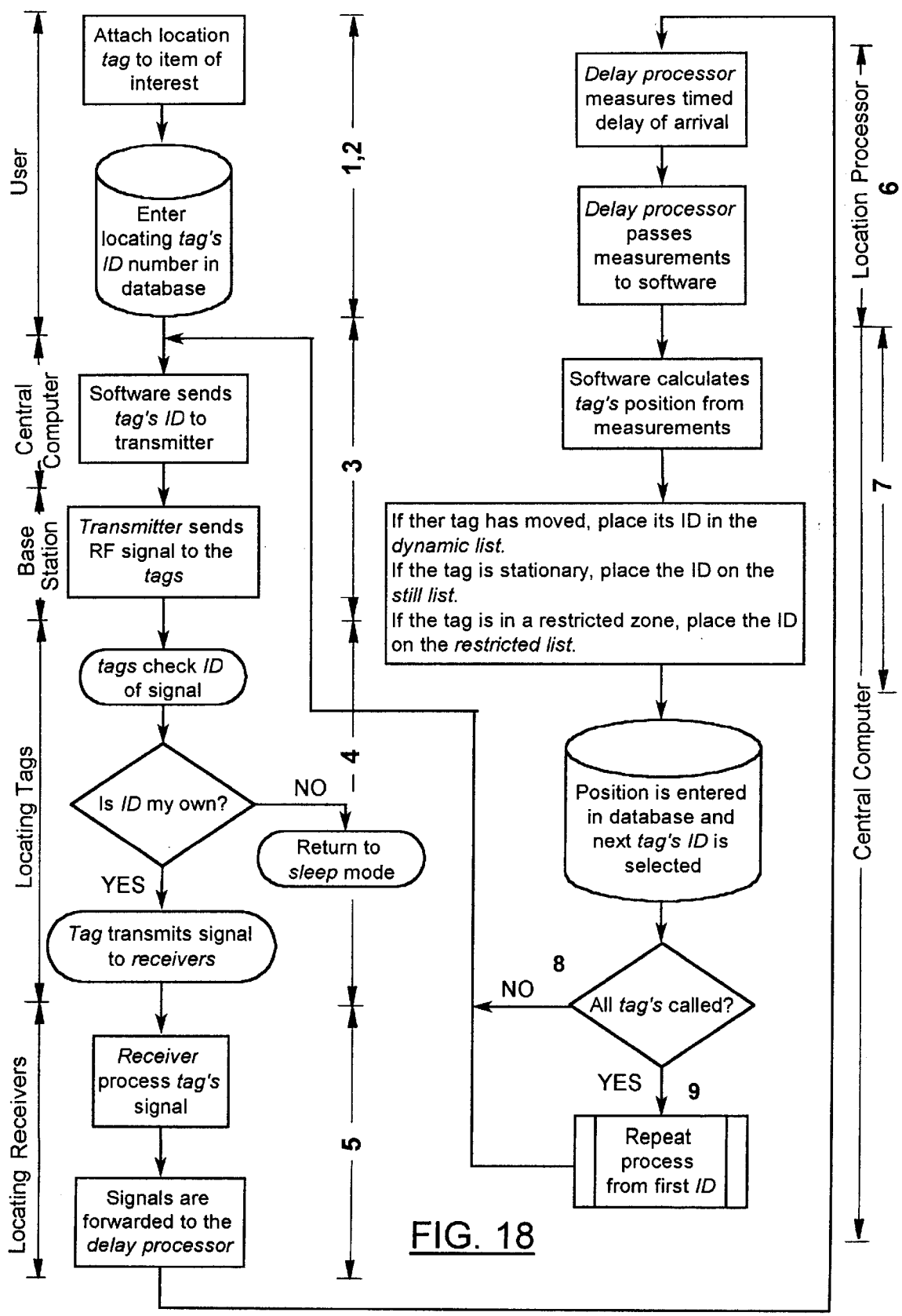
FIG. 18 is a flowchart of the overall system operation in a first embodiment.

As an overview, FIG. 17 shows a flowchart of the input/output signal operation of the central processor, and FIG. 18 shows a flowchart of the overall system operation in a first embodiment. FIG. 18 also shows the logical steps involved in placing an item on the stationary list, the mobile list, or the restricted list. The total time allotted to completely process the position of a single item could be limited, for example, to 100 micro-seconds. (Limiting the time for a tag's transaction has obvious implications on the bandwidth required to exchange the necessary information between the central processor and the tags.) Based on that time, 10,000 items could be tracked in 1 second and 600,000 items could be tracked every minute. This is generally sufficient to monitor merchandise in a retail environment, pallets in a warehouse, or assets in a large building.

Figure 19:
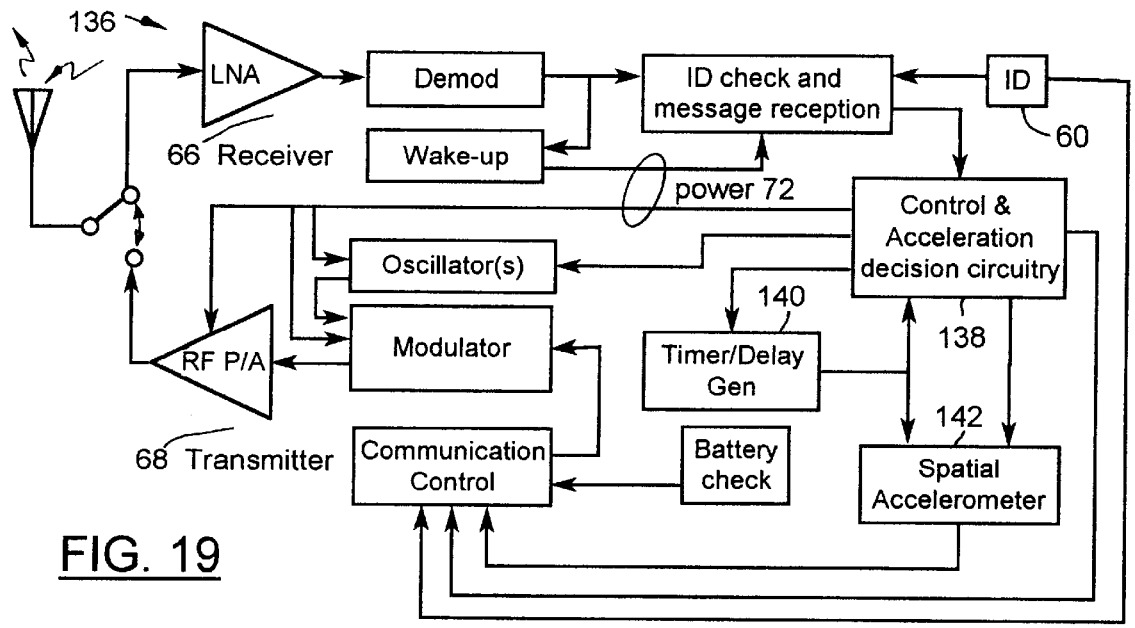
FIG. 19 is a block diagram of a transponder with an integral accelerometer.
Figure 20:
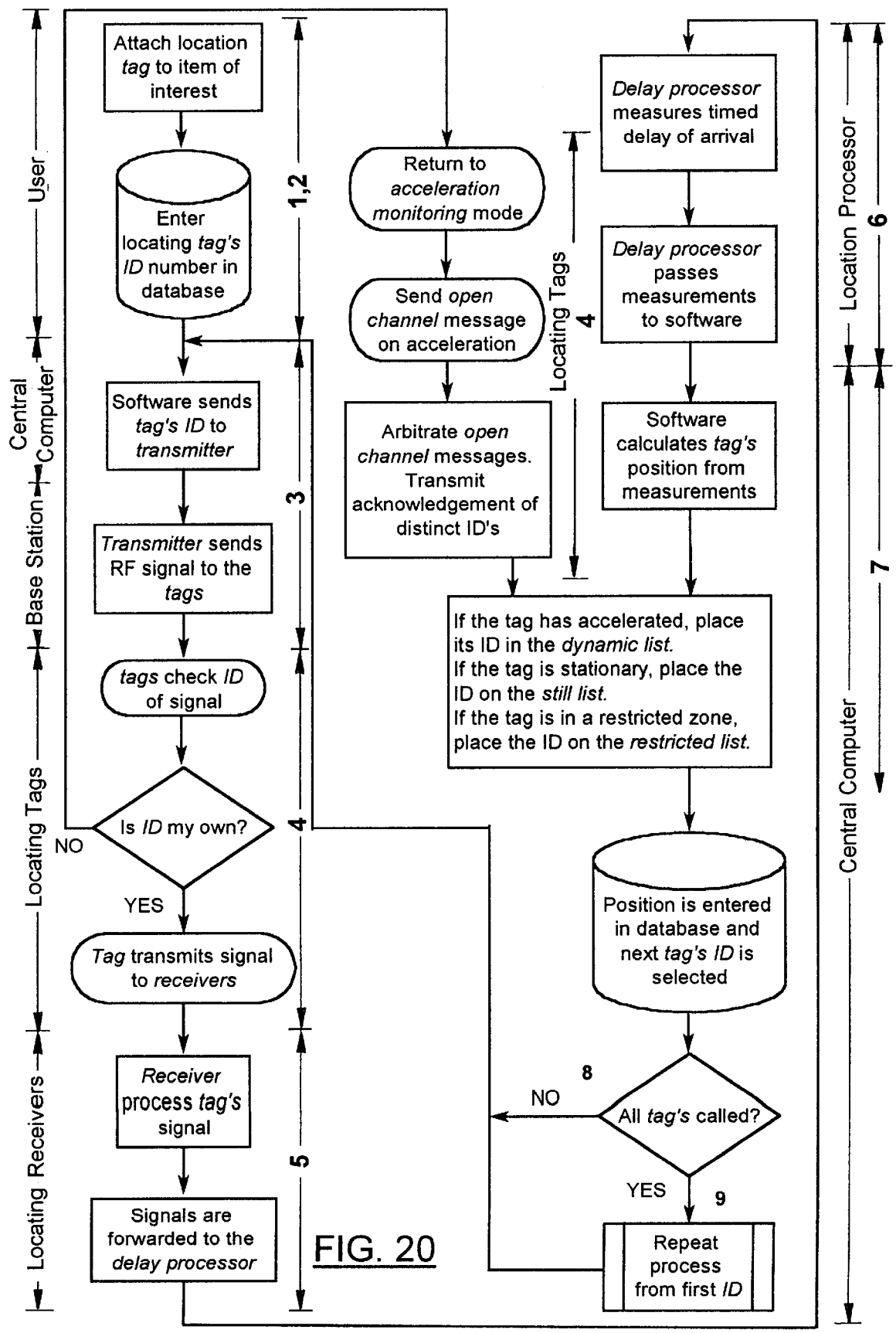
FIG. 20 is a flowchart of the overall system operation in a second embodiment.

In another embodiment of the present invention, the tags affixed to moveable items are transceivers with integral accelerometers. Such a tag is shown at 136 in FIG. 19. It is the transponder or transceiver of FIG. 8 plus control and acceleration decision circuitry 138, a timer/delay generator 140, and a spatial accelerometer 142. The spatial accelerometer 142 is set on a timer by 140 to periodically determine any change in motion for the tag 136. The decision circuitry 138 applies power to the transmitter if the perceived acceleration warrants sending a transmission. The 3DPOS system still operates on the basis of call and response but also employs a third, open channel to support arbitrary communications. The tags are still polled periodically to check their location, and they can also be polled for the purposes of a search. The open channel is used for the tags to indicate to the system that an individual tag is experiencing acceleration, and therefore some change in motion. The level of the accelerometer can be transmitted as a message (with an analog to digital converter - not shown) or as a two-level under/over signal with respect to a preset level of acceleration. An additional receiver is also required to monitor the open channel. The addition of an accelerometer to the tags provides the benefit of minimizing the delay before the motion of a tag is detected. A flowchart of system operation in this embodiment is shown in FIG. 20.

Figure 21:
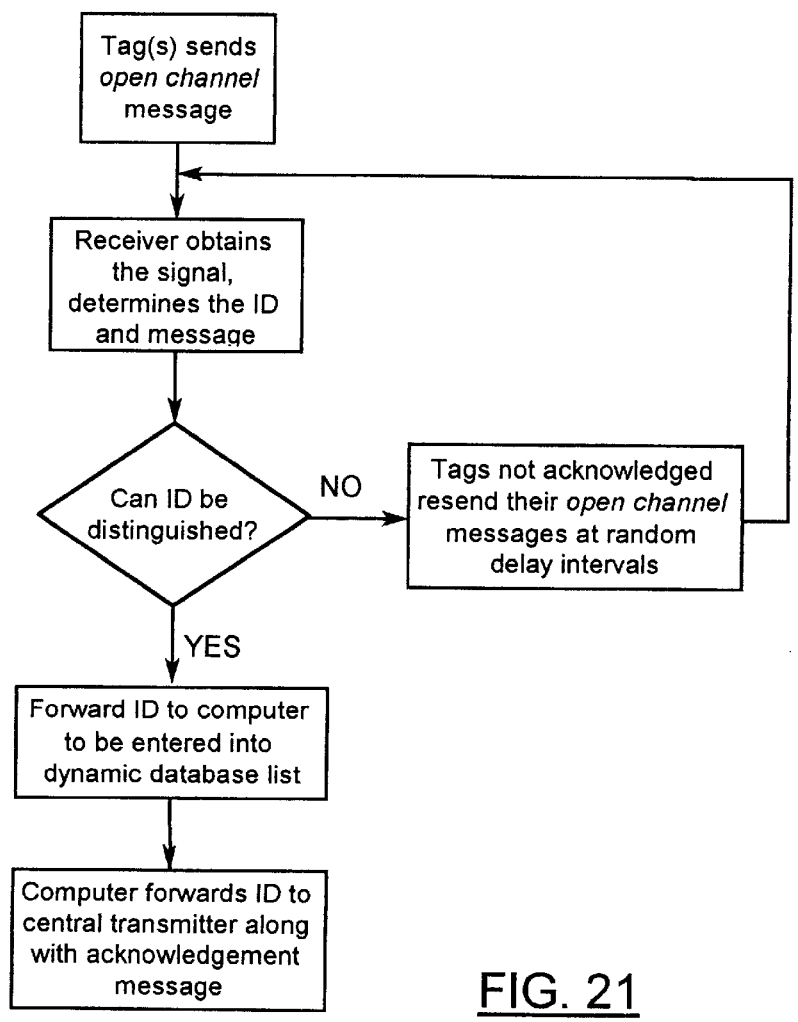
FIG. 21 is a flowchart of the operation of the arbitration scheme for the second embodiment.

Because tag ID numbers may not be discernible if more than one tag transmits simultaneously on the open channel, an arbitration scheme is used to resolve conflicts. Tags in motion continue to transmit until they are acknowledged, but at (pseudo) random delays from their previous broadcasts to prevent further simultaneous transmissions. The arbitration scheme is illustrated in the flowchart of FIG. 21.

In another aspect of this embodiment, wherein the tags affixed to moveable items include an integral accelerometer, the tags are not polled regularly, but instead each tag's accelerometer is relied upon to indicate movement. After an initialization to determine initial locations for all tags, a tag is only contacted to determine its position when it has contacted the system, via the open channel, because it senses that it is in motion. The tags may still be independently contacted in the event of a search or as an infrequent check (for example once a day) on their location.

In this embodiment, once a tag indicates that it is in motion it can be transferred to the mobile tag list described above. Alternatively the accelerometer of the tag can be relied upon entirely to indicate to the central system the path of an object or item. The accelerometers indicate that position information should be determined at each change in direction or speed of the tag. In either case, when a tag enters a restricted zone its position is polled at a very frequent rate. The accelerometer can also transmit the degree of acceleration to the central system, which can then monitor this amount of acceleration and determine if a preset level has been exceeded (indicating jarring, dropping, or an accident). If the preset level has been exceeded, an appropriate flag or other indication can be displayed at the central computer or on any desired screen.

Distinct communication channels can be realized using either separate frequencies, transmission on a single frequency with unique preambles to distinguish the various intended recipients, or, if using spread spectrum techniques, by employing different sequences to distinguish the various channels.

USER RELATED APPLICATIONS OF THE 3DPOS SYSTEM (THE INTELLIGENT LOCATION SYSTEM)

The 3D POS system can be exploited to yield a complete set of software tools, collectively called the Intelligent Location System (trade mark), which incorporates facility/store planning, analysis, visualization, and real-time asset/merchandise tracking. The modules of the system are now described.

Figure 22:
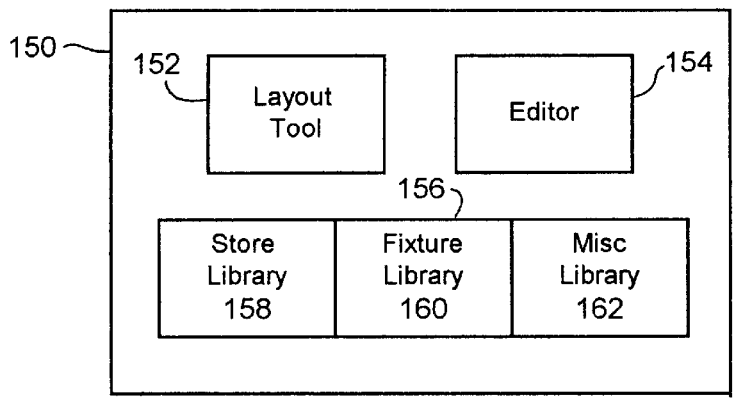
FIG. 22 is a block diagram of the components of the Planner module.

FIG. 22 provides a block diagram of the Planner 150 which is a tool used for planning retail space in 3D. The Planner consists of a Layout Tool 152, an Editor 154, and a Library 156. The Library 156 contains architectural items, furniture/fixture items, and other miscellaneous items for constructing a facility/retail environment. The Library includes three main groups: the PlanLibrary 158 consisting of a database of facility/store plans and primitive architectural items for constructing a facility/store; the FurnitureLibrary 160 consisting of a variety of furniture/fixtures such as shelves, racks, tables, and the like; and the MiscLibrary 162 consisting of a variety of miscellaneous items such as chairs, tills, etc. The Layout Tool provides facility designers, store planners, merchandisers, managers, etc. with a tool for visualizing and planning space. With the Layout Tool, users can select a particular floor plan from the PlanLibrary, populate the facility with specific items from the FurnitureLibrary and the MiscLibrary, try out various layout configurations, and view the results immediately in solid 3D. The Editor 154 provides users with an integrated parametric tool for customizing architecture, furniture/fixtures, asset/merchandise, and other miscellaneous items. It enables users to import items, attach pertinent information to them (e.g. material and color), and store them in their respective libraries so that they are accessible in the Layout Tool.

Figures 23, 24, 25:
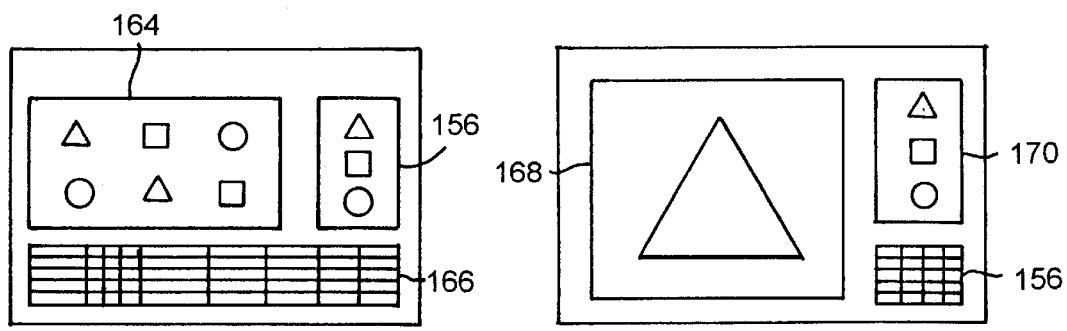
FIG. 23 shows the basic layout of the Layout Tool interface.
FIG. 24 shows the basic layout of the Editor interface.
FIG. 25 shows the basic layout of the Merchandiser interface.

FIG. 23 illustrates the basic layout of the Layout Tool 152 interface which consists of a SceneView 164 which displays objects in both 2D and 3D, the Library 156 for picking objects such as floor plans and fixture items, and a DataView 166 for displaying and manipulating data on object attributes. Every item consists of a graphic and non-graphic data component. The non-graphics related data are stored in an embedded relational database called the FacilityDatabase whereas the graphics related data are stored in a separate 3D database that is linked to the FacilityDatabase. The graphic component appears in the SceneView 164 while the non-graphic component appears in the DataView 166. Graphic and data objects in the SceneView and DataView, respectively, are dynamically linked to each other such that whenever a change is made in either view the other is updated immediately. For example, if the RGB (red-green-blue) values of an object are changed in the SceneView using a color editor, the RGB attributes displayed for that object in the DataView change accordingly.

FIG. 24 illustrates the basic layout of the Editor 154 interface. The layout consists of a 3D Object Editor 168 for modifying architectural and furniture/fixture items, the Library 156 in which the modelled items are stored, and an attribute list 170 for attaching pertinent data to objects. Every item modelled in the 3D Object Editor also, includes a unique Attribute List which represents the object's properties. After an object is modelled it is stored in the Library for users to access it in the Layout Tool.

The Advanced Visualizer tool allows users to take models developed with the Planner 150 and transform them into photo-realistic representations for video, print, QuickTime VR (trade mark of Apple Computer) (interactive panoramas), and other forms of media. The Advanced Visualizer provides full control of lighting parameters and surface materials for simulating realistic store lighting conditions and for applying specific materials and textures to surfaces.

For retail applications, the Merchandiser tool gives store designers and merchandisers the ability to assign specific merchandise to fixtures, experiment with alternative fixture layout designs, and see the immediate impact relating to inventory capacity and profitability. FIG. 25 shows the general layout of the Merchandiser interface. It consists of a 2D/3D SceneView 164, a FixtureView 172, an Electronic Catalogue View 174, and a ReportView 176. The user selects a merchandise item from the catalogue in conjunction with a particular fixture from the floor plan, and then assigns the item to the fixture. Statistics relating to demographics could be used to help merchandise the stores. Depending on the type of fixture, the user has the option to select how the item will be displayed on the fixture. The ReportView 176 provides a summary of the data from different perspectives.

Figure 26A:
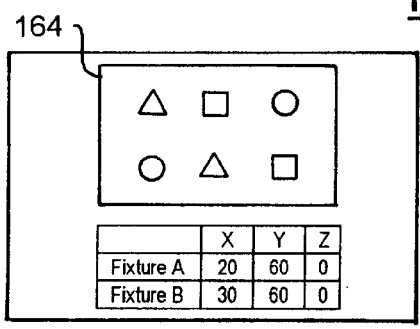
FIG. 26a illustrates the Tracker module interface for tracking fixtures.
Figure 26B:
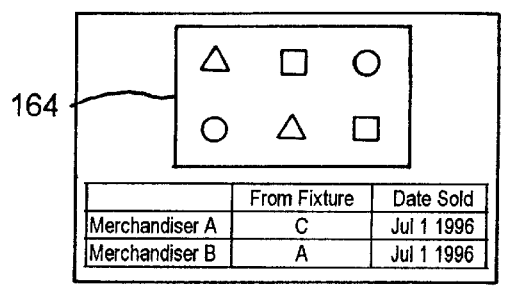
FIG. 26b illustrates the Tracker module interface for tracking merchandise.
Figure 27:
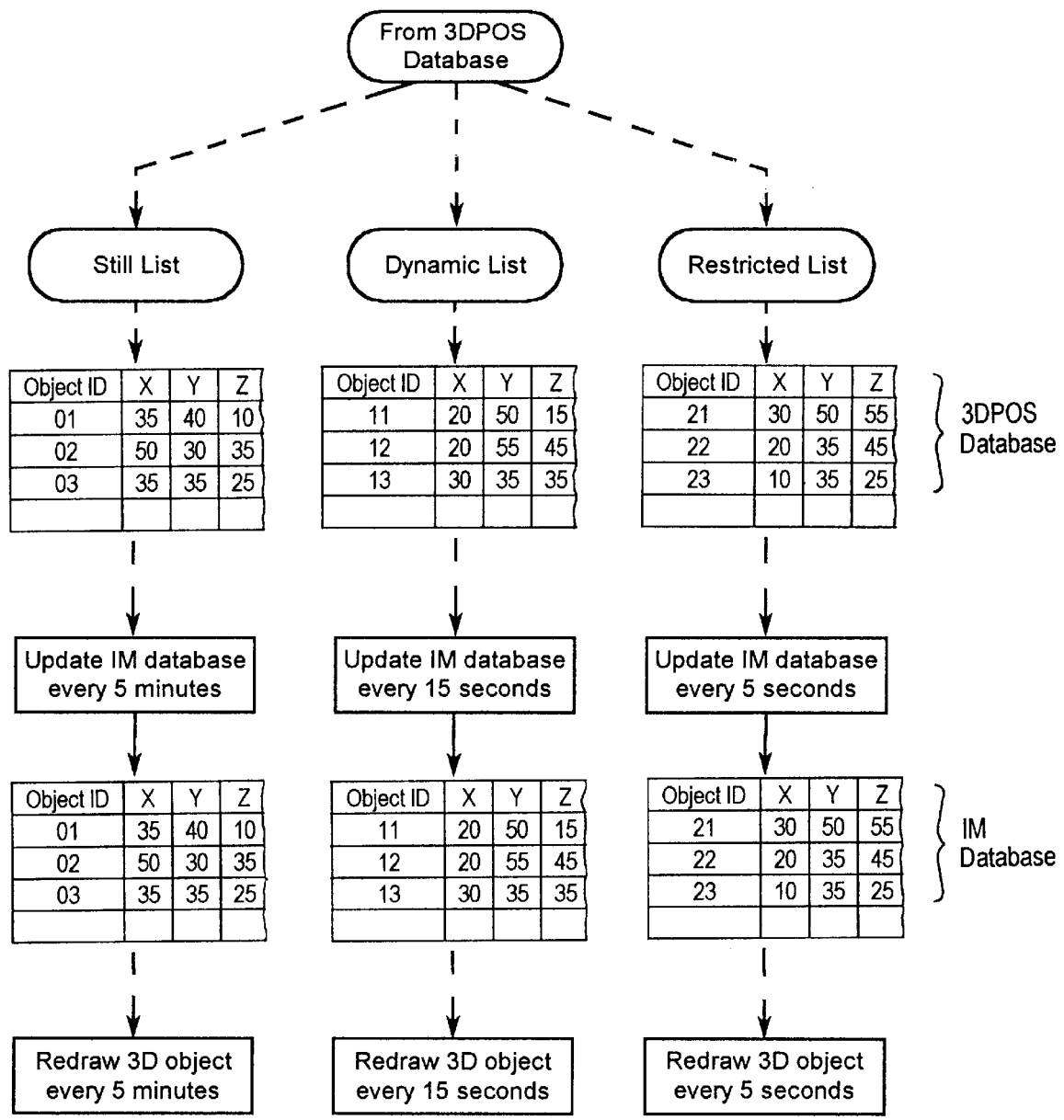
FIG. 27 illustrates how the 3DPOS Database interfaces with the Tracker tool.

The Tracker module as illustrated in FIGS. 26(a) and 26(b) is used for tracking tagged fixtures and assets/merchandise within a defined boundary. It tracks the location of furniture/fixtures to within 1 meter and moveable assets/merchandise to within 10 centimeters. It allows the FacilityDatabase to be automatically updated and the square footage of each department/section to be continuously defined. The Tracker can also display data collected from point-of-sale (POS) systems or other inventory database system to allow organizations to measure facility/store performance with greater accuracy and less effort. 3DPOS data cross referenced with POS or other data allows a user to determine where and when an item was sold or otherwise changed status. FIG. 27 illustrates how the 3DPOS Database interfaces with the Tracker tool.

Figure 28:
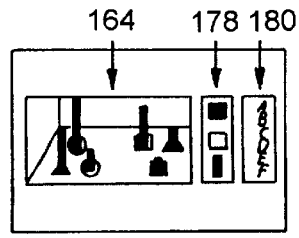
FIG. 28 illustrates the basic layout of the Analyst interface.

The Analyst tool offers users a variety of advanced data visualization, decision making, and mining tools for measuring and analyzing overall facility performance. It allows a manager to quickly see which parts, for example, in retail, which departments of a store, are performing well and which are not with respect to a variety of performance measures. These measures could include total profit, profit per area, and so on. The Analyst tool also offers users a variety of advanced data visualization, decision making, and mining tools for measuring and analyzing micro-level data, for example SKU (stock keeping units), colors, patterns, and styles and for analyzing overall enterprise performance. It allows a centralized manager to quickly see how stores are performing within a particular region. FIG. 28 illustrates the layout of the Analyst interface. It consists of a 3DSceneView 164, a Legend 178, and Data Filters 180 for which users can select and see results immediately, in graphic form. Each object can represent a set of data which can be displayed in a variety of ways. The data can be color-coded or have graphic representations embedded in them to allow for quick visual comparisons.

These software modules or tools provide for several observational and analytical applications of the Intelligent Location (trade mark) system. Those applications are now described in detail.

In a first application the system provides a method for associating a value (e.g. an economic or safety value) to space. In other words, it provides a method for assigning a value to an object based solely on its location in space. This is made possible by cross relating object location data to other data (e.g. mapping 3DPOS data to a POS data set). For example, in predicting the potential profitability of particular merchandise items in a store, one would consider where the items were located and assign a location value to the items in each location, since it is known that items placed in a high traffic area would have a greater chance of being sold as opposed to items placed in a low traffic area.

Figure 29A:
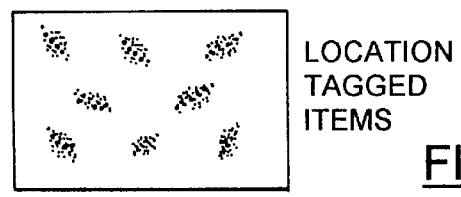
FIGS. 29a and 29b illustrate the display of tagged items in 2D.
Figure 29B:
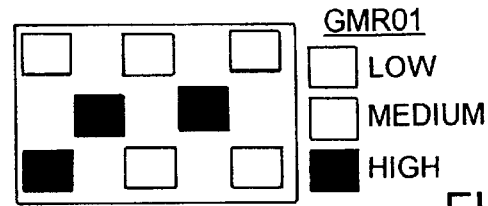
Figure 30A:
FIGS. 30a and 30b illustrate the display of tagged items in 3D.
Figure 30B:
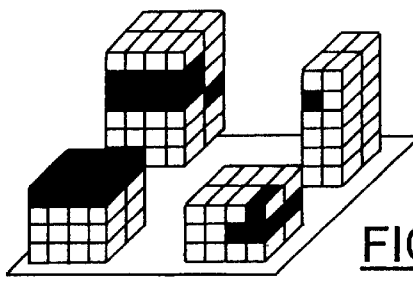
Figure 31:
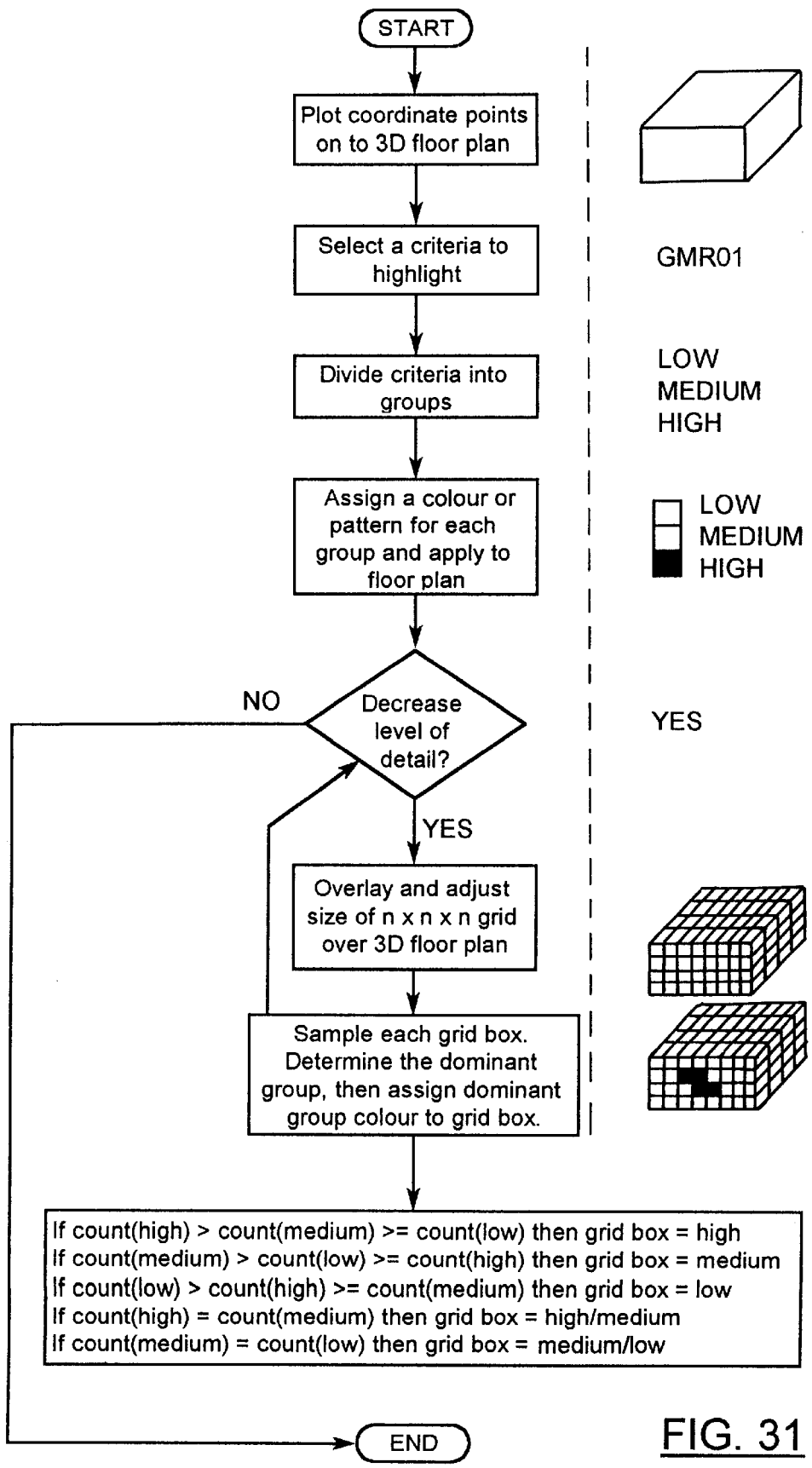
FIG. 31 illustrates a method for displaying tagged items.

In a second application the system provides a method of displaying items that have been tagged and tracked within a defined space. Tagged items are tracked using RF transmitters and their positions are recorded into a database. All tagged items are linked with a corresponding data element from the Point-Of-Sale database. Tagged items are displayed graphically on a control interface and are updated as required. FIG. 29(*a*) shows a method for displaying tagged items as a series of scattered colored dots in 2D. FIG. 30(*a*) illustrates this technique in 3D space. Colored dots can represent specific attributes of tagged items such as product category, margin, turnover, etc. FIGS. 29 and 30 show another display format in which dots can be grouped as blocks of information in 2D and 3D respectively. Blocks can be sized to any dimension depending on the level of detail that is appropriate, hence, the smallest block would be a single dot representing one tagged item. The block size is determined by the size of the nxnxn lattice that is overlaid on the 3D floor plan (or nxn in 2D). For each cube in the lattice, tagged items that fall within it are recorded and tallied. FIG. 30(*b*) illustrates how this information is displayed and FIG. 31 describes, in flowchart form, how it is accomplished.

Figure 32:
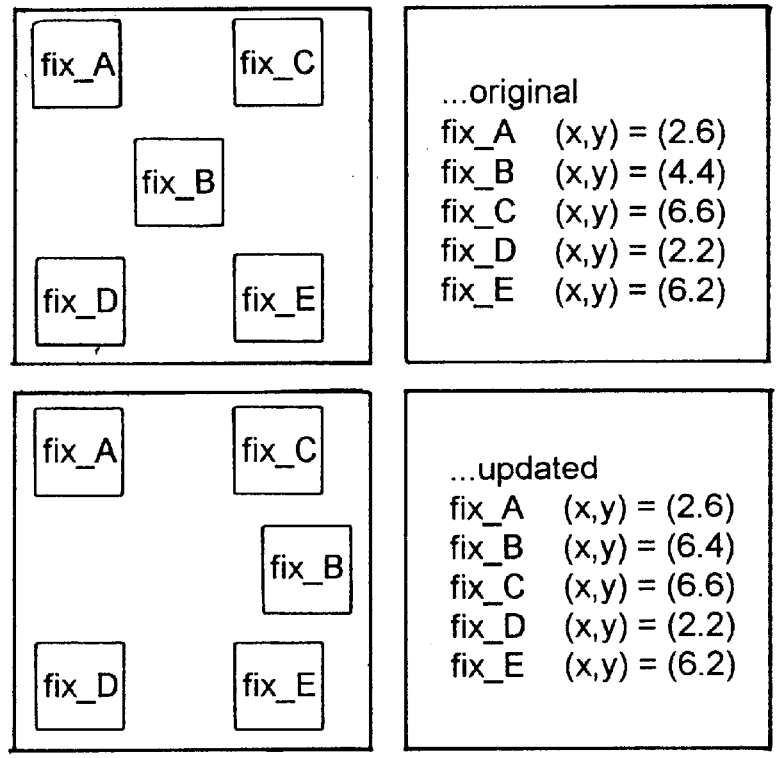
FIG. 32 shows the display for the automatic updating of tagged fixture positions.

In another application the Intelligent Location System provides a method of automatically updating static objects in the virtual environment to reflect the changes in the physical space or some other aspect it is representing. Fixtures that are physically moved from one location to another are automatically updated in the model in near real-time. Fixtures in the virtual model are dynamically linked to the database where the positioning coordinates of the actual fixtures are stored. This is illustrated in FIG. 32. As a fixture in the store is moved from one location to another, the 3DPOS system updates its new position in the database. This information then triggers the fixture in the virtual model to automatically change its location. Furthermore, in another application the system provides a method of automatically updating the square footage of departments or sections of retail space. The location of fixtures can be used to determine the boundary of sections in a retail space.

Figure 33:
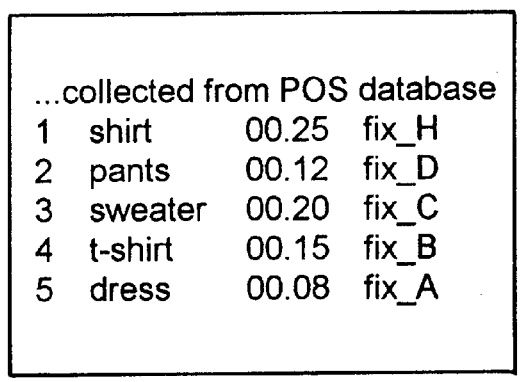
FIG. 33 shows the display for re-creating the path taken by a customer.
Figure 33:
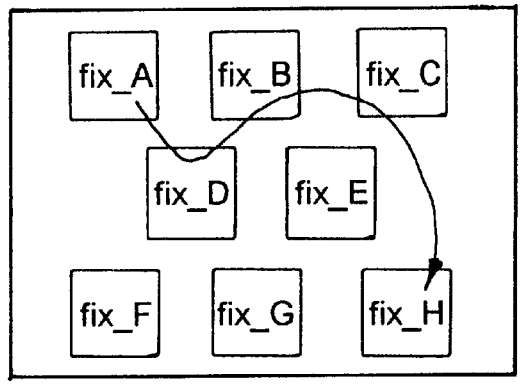

In another application the system provides a method of mapping a path that a customer takes as he or she shops in a store. As a customer shops in the store and picks up merchandise, a path of his or her route can be mapped and be used for further analysis. The path is calculated at the point of purchase. FIG. 33 shows an example of a customer path recreation in which the items purchased by the customer are cross-referenced with the time that the items were taken off their respective fixtures.

Figure 34:
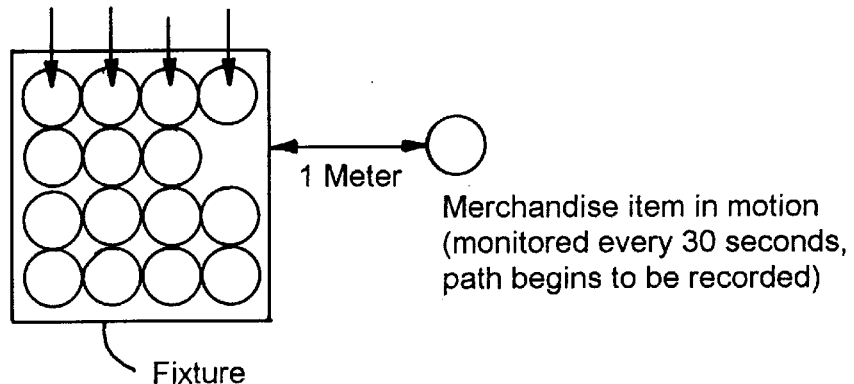
FIG. 34 shows the display for monitoring merchandise that has been removed from a fixture.

In yet another application the system provides a method of automatically updating dynamic objects in the virtual environment to reflect the changes in the physical space it is representing. Items that are physically moved from one location to another are automatically updated in the model in near real-time. As an item is moved, the item is monitored more frequently so that a path can be mapped. In general, tagged merchandise items are polled at a certain frequency, for example every 5 minutes, however once an item is no longer within a given proximity to the fixture in which it was on (for example, the item is moved more than a meter away from the fixture) it is considered in motion and the path on which it travels is mapped out. This is illustrated in FIG. 34. The path is generated by plotting its location point, for instance, every 30 seconds or so. By connecting these points, one can visualize the path taken by the item (and the user/customer).

Figure 35:
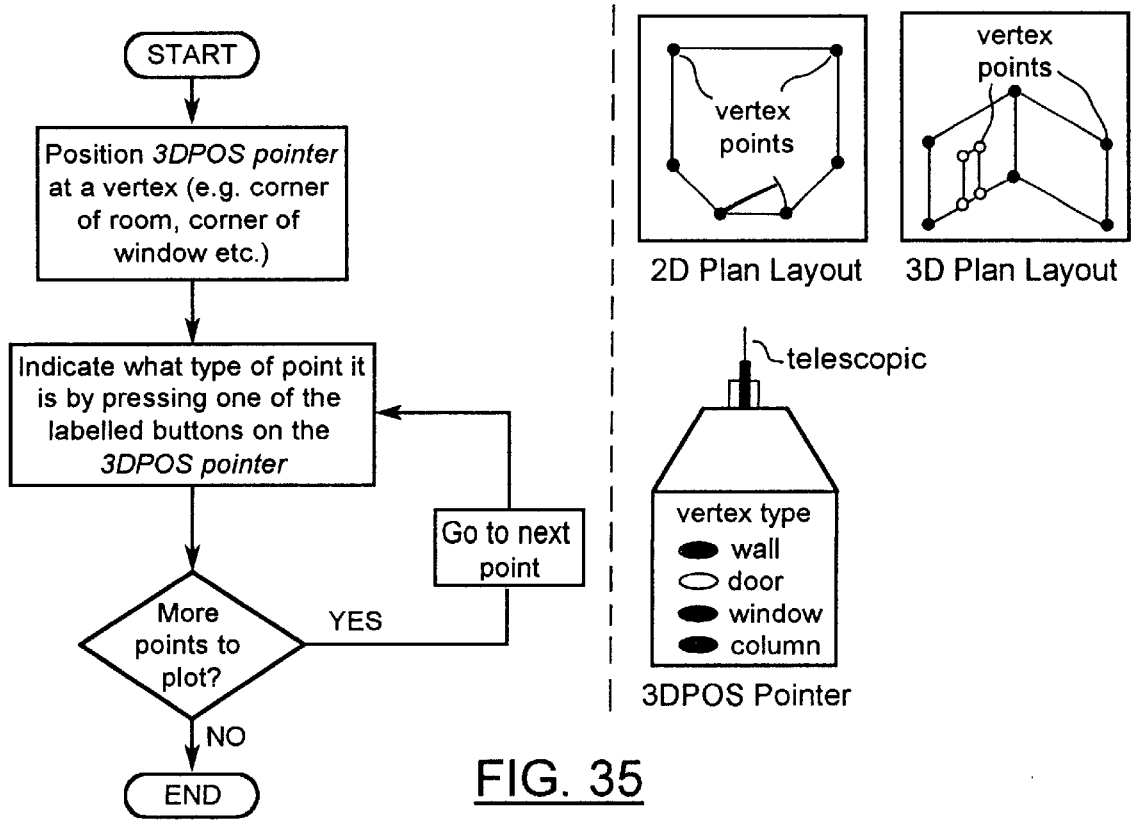
FIG. 35 illustrates the operation of the 3DPOS RF Pointer.

In another application the system provides a method for assisting users in generating floor plans of space. FIG. 35 illustrates how a hand-held device called the 3DPOS RF Pointer allows a user to walk around the perimeter of a facility/store and send coordinate points back to a computer to assist in generating a floor plan or map. The Pointer works the same way as a locating tag, however, additional buttons are placed on this device to manually send coordinate points back to a computer. The Pointer also is able to send back a variety of coordinate points. For example, coordinate points can be distinguished as walls, columns, corners, and doors. The coordinate points are placed in memory and used to generate an appropriate map, in a manner known in the art.

If, after a floor plan or map has been created, such floor plan or map is to be updated, several procedures can be used. One procedure is for the user to walk around the revised portion of the perimeter (e.g. if a new room has been added) with the Pointer and to send back to the computer the coordinate points for the newly added area. The newly added coordinate points are placed in memory and are displayed superimposed on the map of the original space, but e.g. in a different color from the coordinate points of the original space. The user can then manually delete the old coordinate points and retain the new coordinate points, to produce an updated map of the facility/store.

In an alternative method of updating a floor plan (which method is particularly applicable to a retail space), the floor plan of the retail space in question may be defined by the locations of fixtures located on the floor and used to contain or display merchandise for sale. For example in a large department store, the location of a particular department is often defined by the fixtures used by that department rather than by walls (although walls may also form part of the boundary of the space in question). In many cases the fixtures themselves may not move, but their use may change, e.g. from use by one department to use by another. In such cases, the map of the space for the department in question can be defined by a line drawn around the collective fixtures used by the department (such line may be drawn by any of many techniques well known to those skilled in the art). Each fixture used by the department may have an identifying characteristic or attribute which identifies it as belonging to the department in question. If the department is expanded or contracted by adding or deleting fixtures, the identifying characteristic of the fixtures which have been added or deleted is changed appropriately, resulting in a revised map which will show the new configuration of fixtures.

Figure 36:
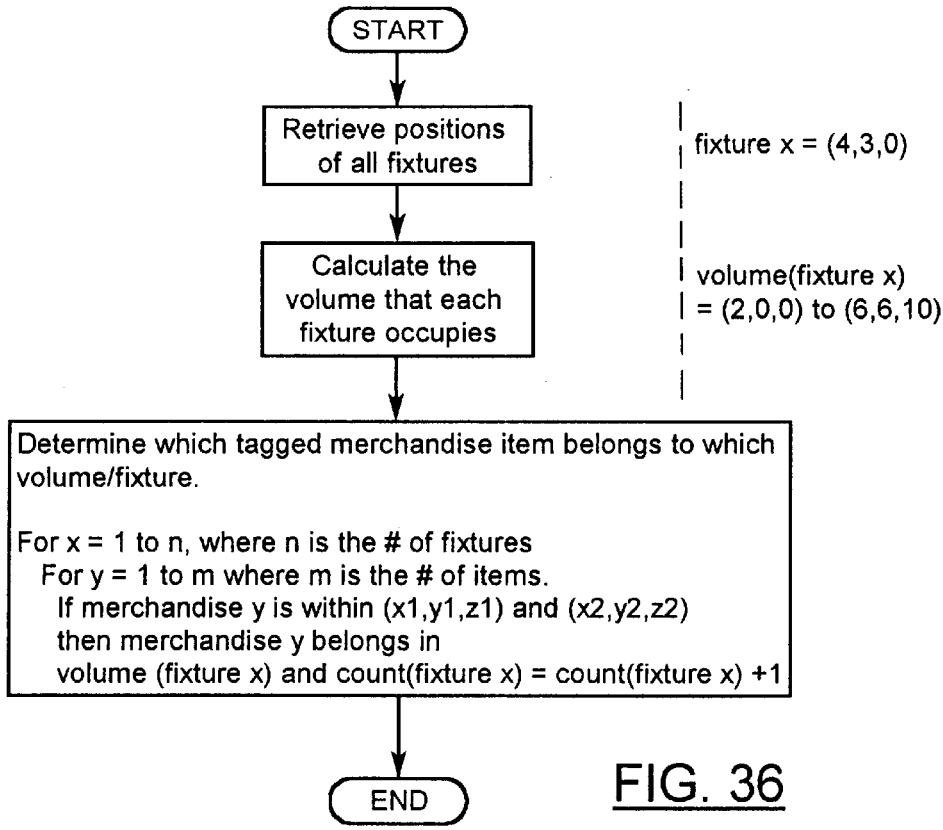
FIG. 36 illustrates a method for associating tagged merchandise with fixtures.

In still another application the system provides a method for allowing data elements to be graphically represented, (e.g. in bar charts or in the forms of other charts or displays) within a 3D environment for quick visual interpretation. FIG. 36 shows how this is accomplished by associating tagged merchandise with fixtures. Any attribute associated with a fixture can be calculated and visually represented as part of the 3D model. For instance, financial measures such as profit per square foot or profit per fixture can be represented as colored bar graphs within the 3D environment. For example, if the total profit per fixture on a specific day was a measure that was of interest, the system would gather the data from that day with respect to which fixtures were on the floor, what merchandise was on the fixtures, and what merchandise was sold and then use this information to calculate the profit for each fixture and display it as shown in FIG. 28.

Figure 37:
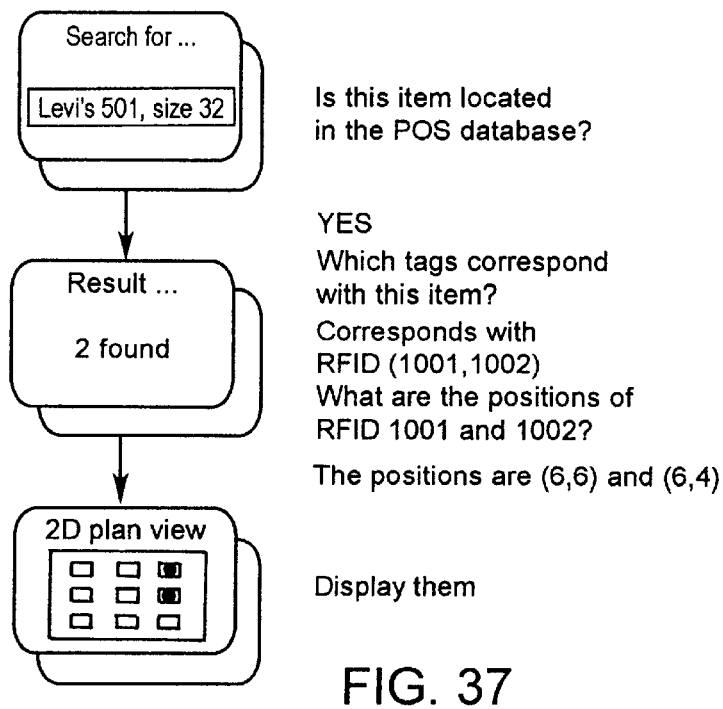
FIG. 37 illustrates a method for locating specific merchandise.
Figure 38:
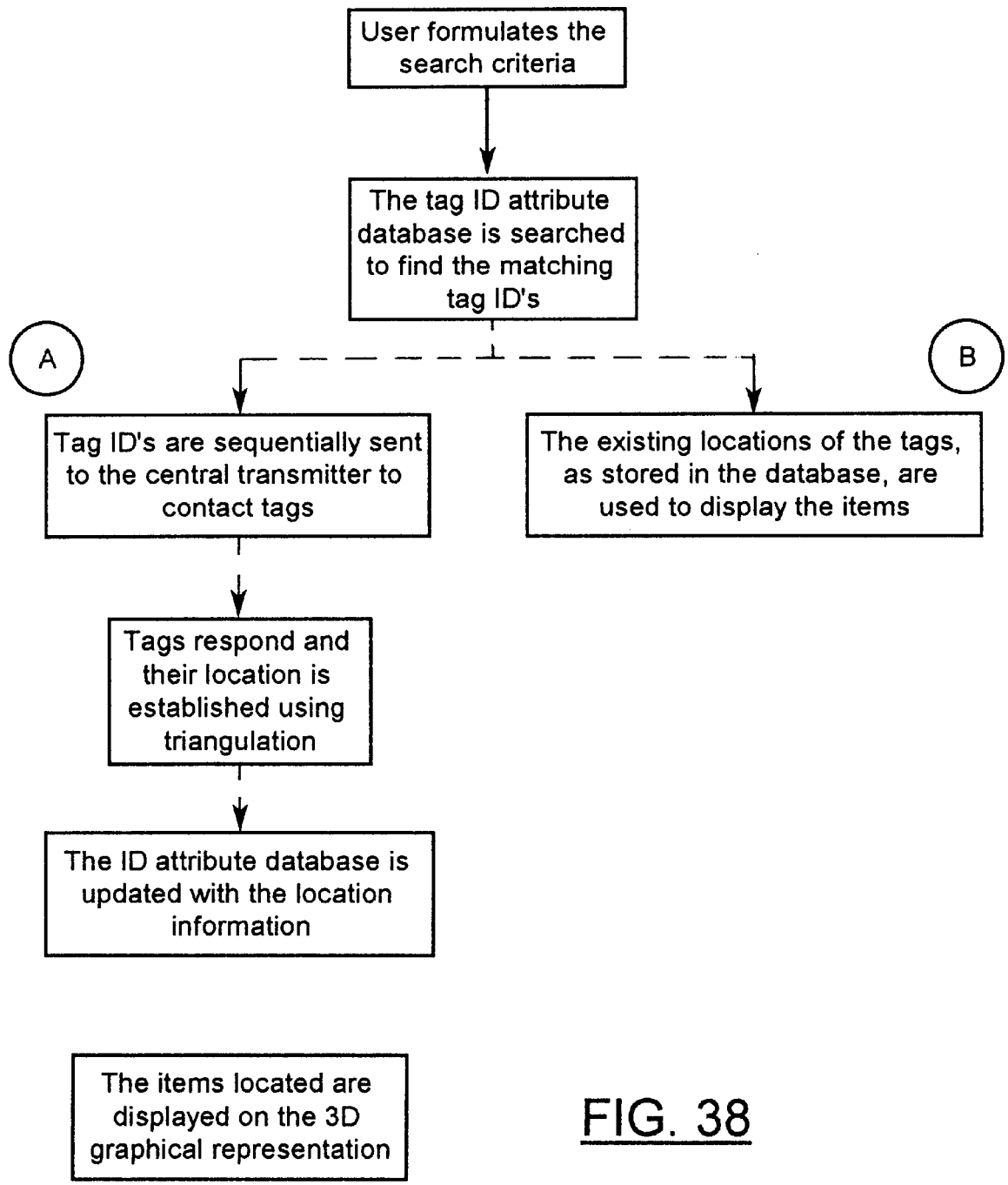
FIG. 38 is a flowchart of how specific tags can be located.

In yet another application the system provides a method for finding tagged items within a defined space, as illustrated in FIG. 37. Items of interest are keyed into the system and the corresponding ID would be located and displayed on the screen. The user would enter item attributes, for example, in retail, "Levi's 501, size 32, etc." into the system and it would query the database for all matching entries and extract the IDs. The system would then transmit signals to the corresponding tags to calculate their position. The data would then be represented in the 3D virtual model or the 2D plan view. FIG. 38 is a flowchart illustrating how specific tags can be located. Either the locations for the matching tags currently in the database can be used or, alternatively, the matching tags can be polled for more up-to-date positioning information.

It will be appreciated that the system can be used to display any combination of two-dimensional or three-dimensional object location with object attributes, for the convenience of users. For example, as indicated above, the object attribute can be the make of the object (e.g. LEVI'S) and the size of the object (e.g. size 32). However the object attribute can be any attribute, e.g. its size, make of manufacture, color, nature of the object, its orientation, whether or not it has recently moved, whether it is sold or not sold, and numerous other attributes. As another example, the user can enter a request for all NIKE running shoes of a particular size and model, and the location of all shoes meeting this description and located in the store will be graphically displayed on a 2D or 3D map of the store. If no objects are found meeting the requested description, the system can be programmed to respond with an appropriate notice such as "nothing found meeting description".

Figure 39:
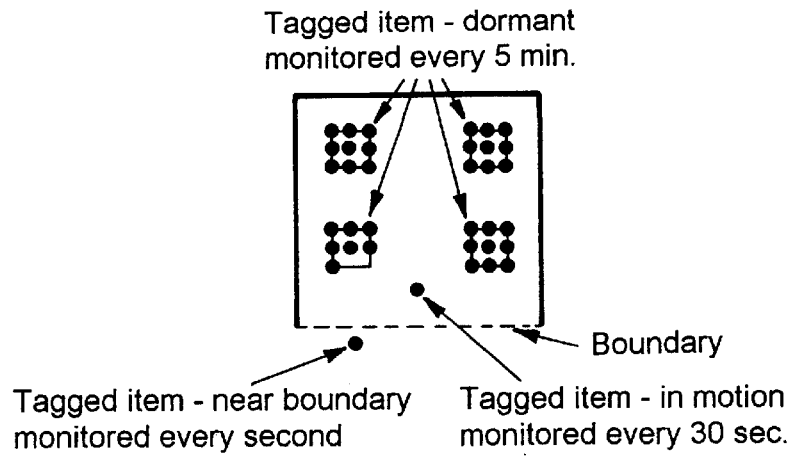
FIG. 39 illustrates a method of tag detection at the boundaries of a defined space.

In another application the system provides a method for detecting if a tagged item was inappropriately removed from the defined space. As tagged items are removed outside the boundaries of the space, the system alerts a user of this event. Typically, items in motion are monitored every 30 seconds, however, as items are moved towards the boundaries, they can be monitored more frequently, for example every second instead of every 30 seconds. This application is illustrated in FIG. 39.

Figure 40:
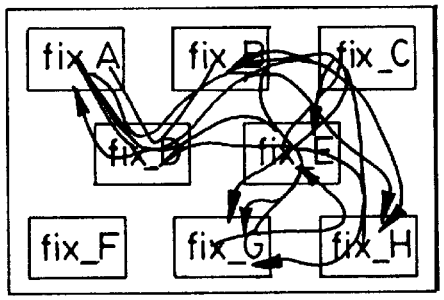
FIG. 40 shows a display of customer traffic per hour.
Figure 40:
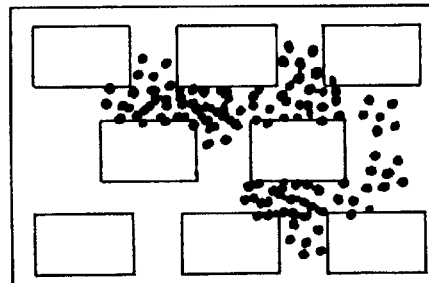
Figure 41:
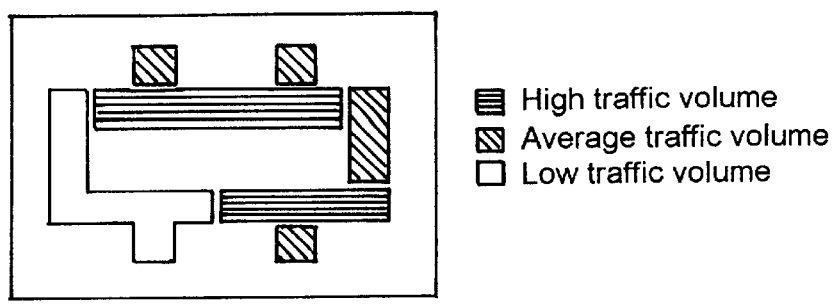
FIG. 41 shows a display of customer traffic zones.

In another application the system provides a method for calculating traffic around a facility/store. For example, in retail, as customer paths are mapped this data can be used to evaluate the high and low traffic areas in the store. As described previously, customer paths are made up of a series of coordinate points that are recorded when items are in motion. FIG. 40 shows a display of these coordinates plotted with respect to time to illustrate traffic per hour. In another application the system provides a method for automatically defining traffic zones. Zones are calculated using the information gathered for measuring traffic. The zones can be set to whatever criteria is desired. For example, three traffic zones representing high traffic (top 33%), average traffic (33–66%) and low traffic (bottom 33%) can be set. FIG. 41 illustrates a display of three such traffic density zones.

As indicated previously, values can be assigned to objects based on their location and space, for example by cross-relating object location data to traffic data. In this method, the top traffic zone would have a higher value assigned to it than the average traffic zone, which in turn would have a higher value than the low traffic zone. The quantums of value can thus be based substantially linearly on traffic movement. Alternatively, value can be assigned based for example on sale of objects from a particular location, rather than being based simply on movement of objects from that location. Sale can be determined by movement of the object in question to the check-out counter followed by removal of the object from the database. Values may thus be assigned to locations based on these or other criteria, and the values may be entered in computer memory and may be displayed in any desired manner.

It will also be seen that the system and method provided by the invention allow users to apply the concept of a complete feedback control loop to the provision of objects in a defined space. For example, the methods and apparatus of the invention allow the location and movement of objects to be observed, the data to be recorded, and equations to be written which employ these data. This in turn allows the user to postulate the effects of changes in the incoming data, and to create equations which project the resulting effects of such changes. When the changes are implemented, the data (e.g. location and movement of objects) can again be recorded and compared to the hypotheses inherent in the equations, to determine the accuracy of the equations. It is then possible to alter the equations to obtain a more accurate representation of the actual effects of changes in the data. Accordingly, the features of the invention allow a complete feedback control loop to be applied to selected attributes of objects in a defined space.

While a system according to the invention has been described largely in connection with a retail store, it will be understood that it can be used in numerous other types of environments, including warehouses, offices, industrial facilities, and any other defined space in which objects of interest are placed.

While preferred embodiments of the invention have been described, it will be appreciated that various changes can be made within the scope of the invention.

We claim:

1. A method of monitoring objects contained in a selected space, each object having a transceiver thereon, each transceiver being capable of responding to an interrogation signal sent by a transmitter by sending a response containing an identification of the object associated with such transceiver, each transceiver having a unique address, said method comprising:

(a) operating said transmitter to interrogate said transceivers sequentially at selected intervals, (b) determining from said transceivers the locations of their associated objects, (c) entering said locations of said objects in a computer memory, (d) reading the contents of said memory and displaying the locations of said objects.

2. A method of monitoring objects in a selected space, each object having a transceiver thereon, each transceiver being capable of responding to an interrogation signal sent by a transmitter by sending a response containing an identification of the object associated with such transponder, said method comprising:

(a) operating said transmitter to interrogate said transceivers at selected intervals, (b) receiving responses from said object at at least two pairs of receivers, (c) determining the difference in arrival times of said response at each receiver of a pair of receivers by initiating the counting of a counter at a time synchronized with the arrival of said response at one receiver of each said pair and by stopping said counter at a time correlated with the arrival of said response at the other receiver of each said pair, (d) and determining from the differences in arrival times of said response at said respective receivers the location of said object.

3. A method of monitoring a set of objects in a selected space, each object having a transceiver thereon and each object having at least one attribute, each transceiver being capable of responding to an interrogation signal sent by a transmitter by sending a response containing an identification of the object associated with such transceiver, said method comprising:

(a) operating said transmitter to interrogate said transceivers at selected intervals, (b) determining from said transceivers the locations of their associated objects, (c) entering said locations of said objects in a computer memory, (d) associating in a computer memory, for each object, at least one said attribute of such object, (e) reading the contents of said memory or memories and displaying the locations of at least selected objects from said set of objects, and at least one attribute of each displayed object.

4. A method according to claim 3 wherein said space is a retail space and said display is superimposed on a map of said retail space.

5. A method according to any of claims 1 to 4 and including displaying the locations of said objects with an accuracy of at least 10 centimeters.

6. A method according to any of claims 1 to 4 wherein said attribute of said object is selected from the group comprising the size of said object, the color of said object, and the nature of said object.

7. A method according to claim 3 including determining whether a said object has moved from one location to another between successive interrogations, and if such object has moved, then interrogating the transceiver of such object at more frequent intervals than said selected intervals.

8. A method according to claim 3 including determining whether a said object has moved from one location to a predetermined area, and if such object has moved to said predetermined area, then interrogating the transceiver of such object at more frequent intervals than said selected intervals.

9. A method according to claim 3 and including determining whether a said object has moved from one location to another between successive interrogations, and if such object has not moved, then continuing to interrogate the transceiver of such object at said selected intervals, and if such object has moved, then interrogating the transceiver of such object at second intervals which are shorter than said selected intervals, and if such object has moved to a predetermined area, then interrogating the transceiver of such object at third intervals which are shorter than said second intervals.

10. A method according to claim 3 and including the step of associating at least two transceivers with an object, interrogating said at least two transceivers associated with such object, and determining from the responses of said at least two transceivers the orientation of said object.

11. A method according to claim 3 and including the step of associating at least two transceivers with an object, interrogating said at least two transceivers associated with such object, and determining from the responses of said at least two transceivers the orientation of such object, and including the step of producing an alarm signal if such object has an undesired orientation.

12. A method according to claim 3 and including the step of associating at least two transceivers with an object, interrogating said at least two transceivers associated with such object, and determining from the responses of said at least two transceivers the orientation of such object, said orientation being a said attribute of such object and therefore being displayed.

13. A method of monitoring displayed objects for sale in a retail space, each object having a transceiver thereon, each transceiver being capable of responding to an interrogation signal sent by a transmitter by sending a response containing an identification of the object associated with such transceiver, said method comprising:

(a) operating said transmitter to interrogate said transceivers at selected intervals, (b) determining from said transceivers the locations of their associated objects, (c) entering said locations of said objects in a computer memory, (d) reading the contents of said memory and displaying said locations of said objects on a map of said retail space.

14. A method according to claim 13 wherein at least some of said objects are located on fixtures in said retail space, said method comprising displaying said fixtures on said map, and displaying on said map at least some of said objects in association with the fixtures on which said objects are located.

15. A method according to claim 13 including determining the location of groups of said objects, entering in said memory the locations of said groups, and displaying on said map the locations of groups of said objects.

16. A method according to claim 13 including determining whether an object has moved from one location to another between interrogations, entering a record of such movement in said memory, and displaying on said map the path of such movement.

17. A method according to claim 13 including determining whether a said object has moved from one location to another between successive interrogations, and if such object has moved, then interrogating the transceiver of such object at more frequent intervals.

18. A method according to claim 17 including determining when an object which has moved remains in a new location for a selected period of time, and then reducing the frequency of interrogation of the transceiver of such object.

19. A method according to claim 13 including determining whether an object has been sold, entering an indication of such sale in said memory, and producing a display on said map of the sales of objects from a plurality of locations in said space.

20. A method according to claim 19 wherein said display comprises a bar chart superimposed on said map, said bar chart having a plurality of bars rising from selected locations in said map, each bar indicating the sale of objects from its associated location.

21. A method according to claim 13 wherein a selected one or more of said objects have unique characteristics, thereby forming a unique set of said objects, said method comprising transmitting from said transmitter an interrogating signal only for the transceivers of said unique set of objects, receiving the responses of the transceivers of said unique set of objects, entering in said memory the locations of the objects of said unique set of objects, and displaying on said map only the locations of the objects of said unique set of objects.

22. A method according to any of claims 13 to 21 wherein said map is a two-dimensional map.

23. A method according to any of claims 13 to 21 wherein said map is a three-dimensional map.

24. A method according to claim 13 including determining whether an object has moved from one location to a second location between interrogations, and determining whether said second location is a restricted location, and providing three lists in said memory, one list being a stationary list for objects which have not moved from one location to a second location between interrogations, a second list being a mobile list for objects which have moved from one location to another between interrogations, and the third list being a restricted list for objects which have moved to a restricted location between interrogations, and entering said objects in said lists depending on whether they have not moved between interrogations, have moved between interrogations, or have moved to a restricted location between interrogations.

25. A method of locating objects included in a set of objects which are located in a defined space, each object having a transceiver thereon and each object having at least one attribute, each transceiver being capable of responding to an interrogation signal sent by a transmitter by sending a response containing an identification of the object associated with such transceiver, said method comprising:

(a) associating in a computer memory, for each object, at least one attribute of such object and the identity of the transceiver on such object, (b) reading from said computer memory the identities of the transceivers associated with selected objects which have selected attributes, (c) operating said transmitter to interrogate the transceivers of said selected objects, (d) determining from the transceivers of said selected objects the locations of said selected objects, (e) and displaying the locations of said selected objects.

26. A method according to claim 25 and including the step of displaying at least one attribute of each displayed object.

27. A method according to claim 25 wherein said locations are displayed on a map of said space.

28. A method according to claim 25 wherein said space is a retail space and said location and said at least one attribute are displayed on a map of said retail space.

29. A method according to claim 25 and including the step of determining when a transceiver of an object has been subjected to an acceleration, and thereupon transmitting from the accelerated transceiver a signal indicative of such acceleration, determining the location of the accelerated transceiver, and displaying such location.

30. A method according to claim 29 and including the step of displaying at least one attribute of the object associated with the accelerated transceiver.

31. A method according to claim 30 wherein said location of the accelerated transceiver is displayed on a map of said space.

32. A method according to claim 1, 2, 3, or 25 wherein said locations are displayed on a map of said space, said space having a plurality of defining locations which define the shape of said space, and wherein said map of said space is produced by moving a transmitter about said space, transmitting from said receiver at said defining locations, determining the locations of said transmitter when it is transmitting, and thereby generating said map of said space.

33. A method of producing a map of a space, said space having a plurality of defining locations which define the shape of said space, said method comprising moving a transmitter about said space and through said defining locations, transmitting from said transmitter at each of said defining locations, determining the location of said transmitter at each of said transmissions and thereby determining the locations of said defining locations, entering said defining locations in a computer memory, and producing therefrom a map of said space.

34. A method according to claim 33 wherein said space is a retail space.

35. A method of updating a map of a space where the boundaries of said space have changed from a first set of boundaries to a second set of boundaries, said first set of boundaries having a first set of defining locations, and said second set of boundaries having a second set of defining locations, said first set of defining locations being stored in a computer memory, said method comprising moving a transmitter in said space through at least said second set of defining locations, transmitting from said transmitter at each defining location of said second set of defining locations, determining the location of said transmitter at each of said transmissions and thereby determining the locations of the defining locations of said second set of defining locations, entering said second set of defining locations in a computer memory, producing a map of said space showing said second set of defining locations superimposed on said first set of defining locations, and deleting from said map at least some of said first set of defining locations which differ from said second set of defining locations.

36. A method of producing a map of a space, said space being defined at least in part by a plurality of fixtures for holding objects, said method comprising placing at least one transceiver on each fixture, said transceivers being capable of responding to an interrogation signal sent by a transmitter by sending a response containing an identification of the fixture associated with such transceiver, said method comprising:

(a) operating said transmitter to interrogate said transceivers, (b) determining from said transceivers the locations of their associated fixtures, (c) entering said locations of said fixtures in a computer memory, (d) associating in said computer memory, for each fixture, an attribute of such fixture, (e) reading the contents of said memory and displaying a map containing fixtures having a selected a common attribute.

37. A method according to claim 36 and including the step of updating said map by entering in said computer memory a record of a further fixture having said common attribute associated with said space, and then displaying a revised map with said further fixture added to said revised map.

38. A method according to claim 36 and including the step of updating said map by removing from said computer memory a record of a selected fixture, and then displaying a revised map with said selected fixture deleted from said revised map.

39. A method according to claim 36, 37, or 38 wherein said space is a retail space and at least some of said fixtures display objects which are for sale.

40. A method for collecting traffic data for objects in a space, each object having a transceiver thereon and each object having at least one attribute, said transceiver being capable of responding to an interrogation signal sent by a transmitter by sending a response containing an identification of the object associated with such transceiver, said method comprising:

(a) operating said transmitter to interrogate said transceivers at selected intervals, (b) determining from said transceivers the locations of their associated objects, (c) entering said locations of said objects in a computer memory, (d) determining whether an object has moved from one location to another between successive interrogations, (e) and displaying an indication of locations which have experienced movement of said objects.

41. A method according to claim 40 and including the step of displaying a map of said space, and displaying on said map, at locations where movements of said objects have occurred, an indication of said movements and of the number of said movements.

42. A method according to claim 41 wherein said space is a retail space.

43. A method according to claim 41 wherein said space is a warehouse.

44. A method of monitoring objects in, a first space and determining when said objects are removed into a second space, each object having a transceiver thereon, each transceiver being capable of responding to an interrogation signal sent by a transmitter by sending a response containing an identification of the object associated with such transceiver, said method comprising:

(a) operating said transmitter to interrogate said transceivers at selected intervals, (b) determining from said transceivers the locations of their selected objects, (c) entering said locations of said objects in a computer memory, (d) determining from said locations of said objects whether an object has entered said second space, (e) and if an object enters said second space, producing an alarm signal.

45. In the method of monitoring displayed objects for sale in a retail space, each object having a transceiver thereon, each transceiver being capable of responding to an interrogation signal sent by a transmitter by sending a response containing an identification of the object associated with such transceiver, the improvement comprising associating a value to a location in said space as compared with the value of other locations in said space, said method comprising:

(a) operating said transmitter to interrogate said transceivers at selected intervals, (b) determining from said transceivers the locations of their associated objects, (c) entering said locations of said objects in a computer memory, (d) determining the frequency of movement of said objects from their respective locations, (e) and assigning values to at least some of locations based on the frequency of said movements of said objects.

46. A method according to claim 45 and including the step of entering said values in a computer memory.

47. A method according to claim 45 wherein said values are substantially linearly related to said frequency of movement of said objects.

48. A method according to claim 45 and including the step of displaying an indication of the frequency of movements of at least one of said objects.

49. A method according to claim 48 wherein said indications are displayed on a map of said space.

50. Apparatus for monitoring displayed objects in a selected space, said apparatus comprising a transceiver on each object to be monitored, a transmitter for transmitting interrogation signals, each transceiver including means for responding to a said interrogation signal by sending a response containing an identification of the object associated with such transceiver, said apparatus including location determining means for determining from the response of a transceiver the location of its associated object, said location determining means comprising at least two pairs of receivers, a counter associated with each pair of receivers, means for initiating counting of a counter at a first time correlated with the arrival of a response at one receiver of a pair, and for stopping counting of said counter at a second time correlated with the arrival of said response at the other receiver of said pair, the difference between said first and second times being representative of the delay in said response arriving at said second receiver as compared with said first receiver, and means for determining from said delays the location of each object.

51. Apparatus for monitoring objects in a selected space, said apparatus comprising a transceiver on each object to be monitored, a transmitter for sending interrogation signals, each transceiver including means for responding to said interrogation signals by sending a response containing an identification of such object, means for operating said transmitter to interrogate said transceivers at selected intervals, means for determining from the responses of said transceivers the locations of their associated objects, and means for determining whether a said object has moved from one location to another between successive interrogations, and means responsive to said last mentioned means for then interrogating the transceiver of such object at more frequent intervals.

52. Apparatus according to claim 51 wherein at least some of transceivers include an accelerometer associated therewith, for determining whether such object is subjected to acceleration and for modifying said response when such acceleration exists.

53. Apparatus according to claim 52 wherein said accelerometer transmits an indication of the level of said acceleration.

* * * * *

UNITED STATES PATENT AND TRADEMARK OFFICE
CERTIFICATE OF CORRECTION

PATENT NO. : 5,920,261  
APPLICATION NO. : 08/775682  
DATED : July 6, 1999  
INVENTOR(S) : George V. Hughes and Chris Ouslis Page 1 of 1

It is certified that error appears in the above-identified patent and that said Letters Patent is hereby corrected as shown below:

In the Specification:

Column 3, lines 15-19, FIG. 14a shows a detailed block diagram of the delay calculation processor.

FIG. 14b shows a wiring diagram for a Motorola® ECLinPS implementation of the circuit of FIG. 14a.

FIG. 15 shows an example of the timing for the delay calculation processor.

should read

--FIG. 14a shows a detailed block diagram of the delay calculation processor.

FIG. 14b is a block diagram showing how Figs 14b(i) and 14b(ii) are to be read.

FIG. 14b(i) shows a portion of a wiring diagram for a Motorola® ECLinPS implementation of the circuit of FIG. 14a.

FIG. 14b(ii) shows the remainder of the wiring diagram for a Motorola® ECLinPS implementation of the circuit of FIG. 14a.

FIG. 15 shows an example of the timing for the delay calculation processor.--

Signed and Sealed this  
Twelfth Day of August, 2014

Michelle K. Lee  
*Deputy Director of the United States Patent and Trademark Office*